US012801142B2

(12) United States Patent
Dittrich et al.

(10) Patent No.: US 12,801,142 B2
(45) **Date of Patent: *Nov. 17, 2026**

(54) SYSTEMS AND METHODS TO ACCOMPLISH A PHYSICAL PROCESS

(71) Applicant: Builders FirstSource, Inc., Irving, TX (US)

(72) Inventors: Shane Christopher Dittrich, Nampa, ID (US); Sean E. Ays, Meridian, ID (US); Mike Aaron Luna, Meridian, ID (US); Brandon Schmidt, Nampa, ID (US); Dean R. Mikel, Eagle, ID (US); Aaron V. Whetzel, Boise, ID (US)

(73) Assignee: Builders FirstSource, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,487

(22) Filed: Jul. 16, 2024

(65) Prior Publication Data

US 2026/0126815 A1 May 7, 2026

Related U.S. Application Data

(63) Continuation of application No. 17/745,670, filed on May 16, 2022, now Pat. No. 12,066,834.

(Continued)

(51) Int. Cl.
*G05B 1/02* (2006.01)
*G05B 19/4155* (2006.01)
(Continued)

(52) U.S. Cl.
CPC ............. *G05D 1/0287* (2013.01); *G05B 1/02* (2013.01); *G05B 19/4155* (2013.01); *G05D 1/692* (2024.01); *G05B 2219/50391* (2013.01)

(58) Field of Classification Search
CPC ...... G05D 1/692; G05B 1/02; G05B 19/4155; G05B 2219/50391
See application file for complete search history.

(56) References Cited

U.S. PATENT DOCUMENTS 9,138,896 B2 * 9/2015 Jenkinson .............. G06V 20/10
9,980,137 B2 5/2018 South et al.
(Continued)

FOREIGN PATENT DOCUMENTS

KR 1020200082801 A 7/2020

OTHER PUBLICATIONS

Plaisanu et al., Control techniques for a holonic manufacturing platform with multiple robots, 2008, IEEE, p. 1-5 (Year: 2008).*
(Continued)

*Primary Examiner* — Mcdieunel Marc
(74) *Attorney, Agent, or Firm* — Alston & Bird LLP

(57) ABSTRACT

The systems and methods can receive object data for an object that is a subject of the physical process and that specifies points of the object; determine operation sequences that each accomplish a portion of the physical process, each operation sequence providing an ordering of a set of physical operations associated with the one or more points of the object; generate an operation schedule specifying timing of performance of each operation sequence and a set of one or more sets of robots to perform each operation sequence; generate physical process data including the operation schedule and the one or more operation sequences; and communicate the physical process data to the one or more sets of robots to perform the one or more operation sequences according to the operation schedule.

21 Claims, 11 Drawing Sheets

Related U.S. Application Data

(60) Provisional application No. 63/189,853, filed on May 17, 2021.

(51) Int. Cl.
*G05D 1/00* (2006.01)
*G05D 1/692* (2024.01)

(56) References Cited

U.S. PATENT DOCUMENTS

| | | | | |
|---|---|---|---|---|
| 10,924,548 | B1 | 2/2021 | Karumbunathan et al. | |
| 11,036,596 | B1 | 6/2021 | Coleman et al. | |
| 11,467,802 | B2 | 10/2022 | Newendorp et al. | |
| 11,922,368 | B1 | 3/2024 | Wozniak et al. | |
| 11,986,965 | B2 * | 5/2024 | Rella | B25J 13/02 |
| 12,066,834 | B2 * | 8/2024 | Dittrich | G05B 19/4155 |
| 2011/0125540 | A1 | 5/2011 | Jang et al. | |
| 2017/0080566 | A1 * | 3/2017 | Stubbs | B25J 9/163 |
| 2017/0100837 | A1 * | 4/2017 | Zevenbergen | G05D 1/0225 |
| 2017/0348854 | A1 | 12/2017 | Oleynik | |
| 2017/0361468 | A1 | 12/2017 | Cheuvront et al. | |
| 2018/0095467 | A1 | 4/2018 | Perrone | |
| 2019/0076949 | A1 * | 3/2019 | Atherton | B25J 9/1684 |
| 2019/0291277 | A1 | 9/2019 | Oleynik | |
| 2020/0249688 | A1 * | 8/2020 | Caussy | G05D 1/0225 |
| 2020/0364173 | A1 * | 11/2020 | Kuzmin | G06F 13/4282 |
| 2021/0331322 | A1 * | 10/2021 | Zhang | B25J 9/1697 |
| 2021/0387350 | A1 | 12/2021 | Oleynik | |
| 2022/0314355 | A1 * | 10/2022 | Schneider | B25J 19/0025 |
| 2022/0365542 | A1 * | 11/2022 | Dittrich | G05D 1/692 |

OTHER PUBLICATIONS

Dudek et al., Scheduling of a Robot's Tasks With the TaskER Framework, 2020, IEEE, p. 1-23 (Year: 2020).*
Michaloski et al., Design principles for a real-time robot control system, 1990, IEEE, p. 264-267 (Year: 1990).*
Wang et al., New fault tolerant robotic central controller for space robot system based on ARM processor, 2008, IEEE, p. 1-5 ( Year: 2008).*
Carpanzano et al., A structured methodology for the design and implementation of hybrid robot controllers, 1998, IEEE, p. 572-577 (Year: 1989).
Chaillet et al., Specification of FMS real-time control based on Petri nets with objects and process failure monitoring, 1993, IEEE, p. 144-149 (Year: 1993).
Graff et al., On the Need of Systemic Support for Spatio-Temporal Programming of Mobile Robot Swarms, 2015, IEEE, p. 227-235 (Year: 2015).
International Search Report and Written Opinion for PCT Appl. Ser. No. PCT/US2022/029473 dated Aug. 23, 2022 (9 pages).
Xu et al., Control middleware for open robot controllers, 2007, IEEE, p. 2462-2467 (Year: 2007).

* cited by examiner

702

SCHEDULING OF OPERATION SEQUENCES

| | TEDDY | GIRAFFE | HIPPO | HIPPO | MONKEY |
|---|---|---|---|---|---|
| BODY | COMPLETE | COMPLETE | FILLING | STITCHING | CUTTING |
| APPENDAGES | LEG 1 - ATTACHED<br>LEG 2 - ATTACHED<br>LEG 3 - ATTACHED<br>LEG 4 - ATTACHED | LEG 1 - ATTACHED<br>LEG 2 - ATTACHED<br>LEG 3 - ATTACHED<br>LEG 4 - ATTACHING<br>TAIL - FILLING | LEG 1 - STITCHING<br>LEG 2 - CUTTING<br>LEG 3 - PENDING<br>LEG 4 - PENDING<br>TAIL - PENDING | **LEG 1 - QUEUED**<br>**LEG 2 - QUEUED**<br>**LEG 3 - QUEUED**<br>**LEG 4 - QUEUED**<br>**TAIL - QUEUED** | **LEG 1 - QUEUED**<br>**LEG 2 - QUEUED**<br>**ARM 1 - QUEUED**<br>**ARM 2 - QUEUED**<br>**HAND 4 - QUEUED**<br>**HAND 4 - QUEUED**<br>**TAIL - QUEUED** |
| HEAD | ATTACHING | FILLING | STITCHING | CUTTING | **QUEUED** |

KEY: IN PROGRESS
QUEUED

FIG. 7

SYSTEMS AND METHODS TO ACCOMPLISH A PHYSICAL PROCESS

RELATED APPLICATIONS

This application is a continuation of U.S. patent application Ser. No. 17/745,670 entitled SYSTEMS AND METHODS TO ACCOMPLISH A PHYSICAL PROCESS, filed May 16, 2022, which claims the benefit of priority under 35 U.S.C. Section 119(e) of United States Provisional Patent Application No. 63/189,583 entitled SYSTEMS AND METHODS TO ACCOMPLISH A PHYSICAL PROCESS, filed May 17, 2021, each of which is hereby incorporated herein by reference in its entirety.

TECHNICAL FIELD

The present disclosure relates generally to the field of automation using robots and similar or other mechanical devices.

BACKGROUND

As technology continues to advance, a greater number of devices, (e.g., systems, robots, machines, and other "things") become available to perform a multitude of functions. From very simple electronics to highly complex machines, more and more devices with greater autonomy are introduced. Autonomous devices (e.g., any "thing" having a measure of programmability and/or autonomy) are proliferating in use in almost every aspect of society, including but not limited to manufacturing (mass production of consumer and industrial goods), assembly and packing, transport, exploration, healthcare (e.g., surgery), and military (e.g., weaponry). Autonomous devices are being introduced to perform tasks that humans are unable to do (e.g., because of size limitations, complexity, danger, disease, regulations) or simply prefer not to do (e.g., because the tasks are repetitive, monotonous, tedious, in extreme environments such as outer space or the bottom of the sea, etc.). Autonomous devices are being introduced to increase efficiency, reduce costs, improve accuracy or quality, and many other reasons.

As advanced and versatile as modern technology can create autonomous devices, coordinated operation of such devices to perform physical tasks (e.g., tasks involving coordinated interaction at points in physical space) can be challenging. From the simplest electronics to the most advanced robots, autonomous devices are generally designed and configured to perform a particular set of one or more tasks, and to perform that set repeatedly. The simpler the autonomous device, the less versatile to be able to participate in coordination with other autonomous devices to perform physical operations. A programmable thermostat can turn on and off the HVAC system (and may communicate information to other devices), but otherwise is quite limited to cooperate with other autonomous devices to perform a physical process outside of its intended purpose. On the other hand, the more complex and versatile the autonomous device, the more challenging to reconfigure the autonomous device. This is particularly the case when the interaction or coordination of the autonomous devices is at one or more physical points in physical space (as compared to, for example, an electronic interaction or a software interaction). A six-axis robotic arm can require hours of manual human programming in order to be configured to perform a particular task, and the programming is by a skilled person having understanding, education, training, and/or an otherwise acquired skillset to program. A list of actions (e.g., a recipe) must be prepared and programmed into the six-axis robotic arm for all the movements or actions that the robot is to perform as part of performing the overall task. Programming each action of the six-axis robotic arm may include setting starting points for movement and ending points of movements and pathways between such starting and ending points. Determining and programming the pathway can be the most challenging part because of physical constraints (e.g., potential obstructions in the pathway and the capability of the robot itself) in the physical environment. Often trial-and-error followed by adjustment is needed to verify pathways. Re-programming that robot to perform a different task requires repeating those hours of human programming (by a skilled programmer person) for the different task. Even robots with the most advanced artificial intelligence (AI) are focused or otherwise directed to learn and iterate improvements on a particular set of tasks, and coordination with other robots (i.e., external to the AI environment) requires significant re-programming and/or configuration.

Many software systems and frameworks have been proposed to make programming robots and other autonomous devices easier. These advances have somewhat reduced the human hours required to reconfigure robots and other autonomous devices to perform a different set of tasks. Nevertheless, prior to the present disclosure, configuring coordinated operation of a set of multiple autonomous devices has in essence required manual programming and trial-and-error testing at the individual autonomous device level (i.e., individually programming each autonomous device in the set), and reconfiguring the set requires re-programming each individual autonomous device.

SUMMARY

The present disclosure is directed to systems and methods to automate or otherwise accomplish a physical process. The systems and methods can include scheduling and providing instructions to one or more sets of robots to perform sequences of operations toward accomplishing the physical process.

Additional aspects and advantages will be apparent from the following detailed description of preferred embodiments, which proceeds with reference to the accompanying drawings.

BRIEF DESCRIPTION OF THE DRAWINGS

FIG. 7 illustrates a snapshot of the progress of multiple operation schedules at a single point in time.

DETAILED DESCRIPTION OF PREFERRED EMBODIMENTS

Figure 1:
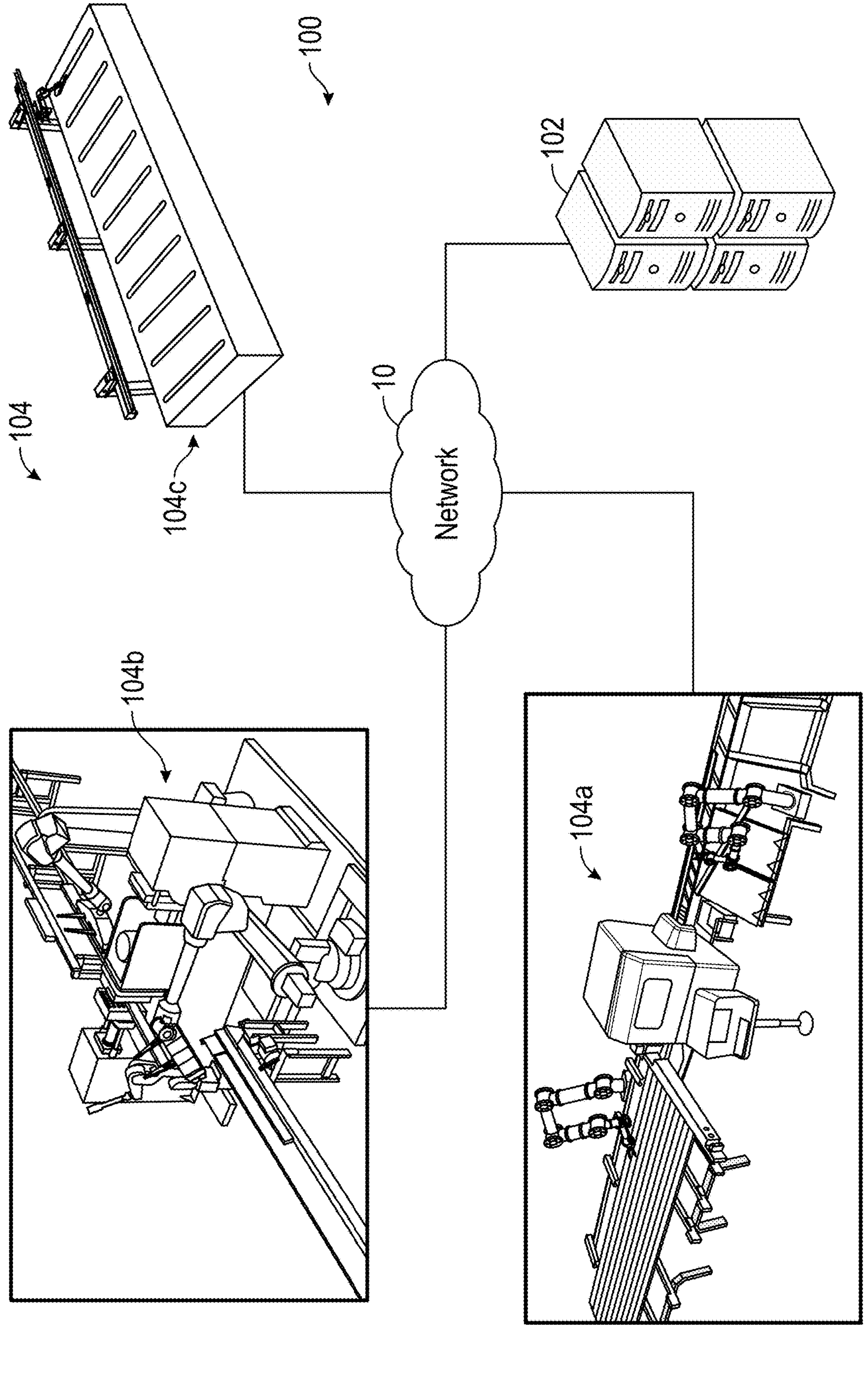
FIG. 1 is a diagram of a system to accomplish a physical process, according to one embodiment of the present disclosure.

The rapid advance of technology is producing astounding devices, (e.g., systems, robots, machines, and other "things") to perform a multitude of functions. An increasing multitude of devices that are being introduced are autonomous devices, which have a measure of programmability and/or autonomy. The level of autonomy of newly introduced autonomous devices is ever increasing. Autonomous devices are proliferating through every aspect of society in the present Information Age, including but not limited to manufacturing (mass production of consumer and industrial goods), assembly and packing, transport, exploration, healthcare (e.g., surgery), and military (e.g., weaponry). Autonomous devices are increasingly developed and/or put to use to perform tasks that humans are unable to do (e.g., because of size limitations, complexity, danger, disease, regulations) or simply prefer not to do (e.g., because the tasks are repetitive, monotonous, tedious, in extreme environments such as outer space or the bottom of the sea, etc.). Autonomous devices are also increasingly being introduced to increase efficiency, reduce costs, improve accuracy and/or quality, and for many other reasons.

As far as modern technology has progressed to be able to create advanced and versatile autonomous devices, coordinated operation of such devices to perform physical tasks (e.g., tasks involving coordinated interaction at points in physical space) can be challenging. Autonomous devices, from the simplest to the most advanced, are generally directed to perform a particular set of one or more tasks, and to perform that set repeatedly.

Coordinating autonomous devices such that performance of respective tasks is in concert to accomplish a physical process (i.e., operations with respect to an object in the physical world) is difficult. The simpler the autonomous device, the simpler the configuration (e.g., programming), and the simpler the autonomy, which means less versatility to be able to participate in coordination with other autonomous devices to perform physical operations. On the other hand, the more complex and versatile the autonomous device, the more challenging to reconfigure the autonomous device. This is particularly the case when the interaction or coordination of the autonomous devices is at one or more physical points in physical space (as compared to, for example, an electronic interaction or a software interaction). College engineering students can spend an entire semester on a robotics project building a simple "pick and place" robot that picks up an object and places it in a location. Coordinating of those pick and place robots to interact in the physical world with respect to that object would take even longer. A six-axis robotic arm is designed to perform tasks in the physical world and can be coordinated with other six-axis robotic arms and other robots. However, these robots can require hours of manual human programming in order to be configured to perform a particular task, and the programming is by a skilled person having understanding, education, training, and/or an otherwise acquired skillset to program. A list of actions (e.g., a recipe) must be prepared and programmed into the six-axis robotic arm for all the movements or actions that the robot is to perform for performing the task. Programming each action of the six-axis robotic arm may include setting starting points for movement and ending points of movements and pathways between such starting and ending points. Determining and programming the pathway can be the most challenging part because of physical constraints (e.g., potential obstructions in the pathway and the capability of the robot itself) in the physical environment. Often trial-and-error followed by adjustment is needed to verify pathways. Re-programming that robot to perform a different task requires repeating those hours of human programming (by a skilled programmer) for the different task. Even robots with the most advanced AI are focused or otherwise directed to learn and iterate improvements on a particular set of tasks, and coordination with other robots (i.e., external to the AI environment) requires significant re-programming and/or configuration.

Many software systems and frameworks have been proposed to make programming robots and other autonomous devices easier. These advances have somewhat reduced the human hours required to reconfigure robots and other autonomous devices to perform a different set of tasks. Nevertheless, prior to the present disclosure, configuring coordinated operation of a set of multiple autonomous devices has in essence required manual programming and trial-and-error testing at the individual autonomous device level (i.e., individually programming each autonomous device in the set), and reconfiguring the set requires re-programming each individual autonomous device.

The present disclosure is directed to systems and methods to automate or otherwise accomplish a physical process. The systems and methods can include scheduling and providing instructions to one or more sets of robots to perform sequences of operations ("operation sequences") toward accomplishing the physical process. The disclosed embodiments can provide straightforward coordination of robots and/or sets of robots to accomplish a physical process with respect to an object that is the subject of the physical process. Further, the disclosed embodiments provide for rapid re-configuration of robots and/or sets of robots to accomplish a different physical process with respect to a different object. The disclosed embodiments can repeatedly perform different physical operations pertaining to different objects. Repetitions (or cycles) of the disclosed systems and methods of automating or otherwise accomplishing physical processes can occur in relatively rapid succession and can occur without any need of human involvement to re-program or otherwise re-configure any robot or set of robots of the system.

The term "autonomous device" is used herein in a broad sense to refer to a device capable of executing one or more actions automatically, which in a broad sense includes all devices with any degree of autonomy. An autonomous device can, at some point, be configured to execute such one or more actions. An autonomous device can be a device that receives (or can be configured to receive) input to prompt execution of such one or more actions.

As used herein, the term "robot" refers to a programmatically operable mechanism capable of executing one or more actions automatically, which in a broad sense includes all devices with any degree of autonomy. The scope of the term robot is intended to encompass the simplest configurable electronic devices to the most complex configurable machines. The term robot includes, but is not limited to, complex devices generally thought of in the field of robotics, such as six-axis robotic arms, fully autonomous vehicles, and devices including artificial intelligence and/or machine learning. Examples of robots referenced herein include, but are not limited to, devices that include at least one of: single-direction locomotion, multiple-direction locomotion, rotation about a single axis, and rotation about multiple axes. Examples of robots herein encompass devices ranging inclusively from unidirectional conveyors to seven-axis articulating arms. Stated otherwise, the terms "robot" and "autonomous device" can be used interchangeably herein.

FIG. 1 is a diagram of a system 100 to accomplish a physical process, according to one embodiment of the present disclosure. The system 100 includes a controller computing device 102 and one or more stations 104*a*, 104*b*, 104*c* (also generally referenced individually and collectively here as station(s) 104). Each of the one or more stations 104 may be a set of one or more robots (e.g., autonomous devices). The controller computing device 102 may be in electronic communication with the one or more stations 104 via a network 10. The system 100 can be configured (and re-configured) to automate the physical process or to otherwise accomplish the physical process to effectuate a result in the physical world. With appropriate stations 104 (sets of robots), the system 100 is designed to perform physical processes with respect to objects (e.g., physical structures) as varied as snowflakes. The physical process can include one or more of: constructing an object (e.g., a physical structure); deconstructing an object; inspecting at least a portion of an object; moving an object; integrating (e.g., mixing, coupling) constituent components of an object; and/or applying another object or element (e.g., paint, glue) to an object.

The system 100 can fully automate (e.g., in essence no human involvement) a physical process or partially automate a physical process. Stated otherwise, the operations to accomplish the physical process may be entirely performed by robots of the system (full automation) or may be primarily performed by robots in coordination with some additional actions by a human (partial automation).

The controller 102 can read, access, or otherwise receive system data for the one or more stations 104. The system data enables the controller to have awareness of system characteristics, including system capabilities and system constraints for each robot of the one or more stations 104.

The controller 102 can receive object data for one or more objects. An object can be any physical thing that can be a subject of the physical process. A very few examples of an object include, but are not limited to: a package of items (e.g., sack, box, crate, bin, and including a package of packages (e.g., pallet, stack)); a structure or structural member (e.g., building, module of a modular building, roof/floor truss, wall, tower (e.g., cellular, electricity transmission); bridge, tunnel, column, platform); a device (e.g., appliance, electronic device); and machinery (e.g., automobile, airplane, semi-truck, boat, robot, heavy equipment, amusement park ride). The object data may include information about the object (which can be any tangible thing existing or to be created in physical space) so that the object may be ascertained or otherwise understood by the system 100 (e.g., the controller). The object data may be received with a physical process to be performed and/or may include information from which a physical process may be derived.

The controller 102 can glean constraint data from the system data and/or object data, or can separately receive constraint data. The constraint data can indicate constraints on the system and/or constraints on the object. The constraints may be inherent constraints (e.g., robot constraints, material constraints, object constraints). The constraints may be externally composed constraints (e.g., the environment of the system, requirement(s) imposed on the object).

Based on the system capabilities and/or the object data, the controller 102 can determine (e.g., generate and/or modify) one or more operation sequences each to accomplish a portion of a physical process with respect to an object. Each operation sequence of the one or more operation sequences provides an ordering of a set of physical operations. The set of operations may be associated with one or more points of the object. The set of operations of each operation sequence are determined to be performed by the set of robots of the station 104. The operation sequence may be determined with a particular set of robots in consideration.

For example, a shaping station 104*a* may have capability to cut or otherwise shape lumber into members of a structure (e.g., a truss) and the controller 102 may determine an operation sequence for the cutting station 104*a* with operations for lumber infeed by an infeed robot, operations for shaping or cutting by a saw robot, and operations for member outfeed by an outfeed robot. A plating station 104*b* may have capability to pre-plate or otherwise plate members of a structure (e.g., a truss) and the controller 102 may determine an operation sequence for the plating station 104*b* with operations for member infeed by an infeed robot, operations for plating by a plate picking robot and a press robot, and operations for member outfeed by an outfeed robot. An assembly station 104*c* may have capability to assemble members of a structure (e.g., a truss) and the controller 102 may determine an operation sequence for the assembly station 104*b* with operations for member placement by a placement robot, operations for positioning members by a table robot, operations for plating by a plate positioning robot and a press robot, and operations for structure outfeed by an outfeed robot. The controller 102 may determine an operation sequence for each station that is to participate in automating or otherwise accomplishing a given physical process.

In other embodiments, the controller 102 may receive operation sequences from an external source, such as from a user or from a separate computing device (e.g., from a client computing device via a communication network). In some embodiments, the controller 102 may receive operation sequences from another controller (e.g., a controller of a different system). In such instances of receiving operation sequences, the controller 102 may operate primarily to generate an operation schedule.

The controller 102 can generate an operation schedule specifying timing of performance of each operation sequence of the one or more operation sequences and a station 104*a*, 104*b*, 104*c* to perform each operation sequence. The controller 102 may receive a process prioritization to indicate an ordering or other priority according to objects and/or the physical processes of which the objects are the subject and the controller 102 can generate an operation schedule based on an object, the system, and a prioritization among the multiple objects (if any).

The controller 102 can also generate physical process data to instruct the stations to execute the operation sequences and thereby automate or otherwise accomplish the physical process. The physical process data includes instructions, configurations, variable values, and the like and is formatted or otherwise provided in a manner to instruct each station in performing one or more operation sequences toward automating or otherwise accomplishing the physical process. The physical process data can be data for the entire system 100 or data specific to each station 104*a*, 104*b*, 104*c* of the system 100. The physical process data can be formatted in a manner as anticipated, required, or otherwise expected by each station 104*a*, 104*b*, 104*c*. In some embodiments the stations 104 may request the data from the controller (e.g., a pull). In some embodiments, the controller 102 may actively distribute or transmit (e.g., push) the physical process data to each station 104*a*, 104*b*, 104*c*.

The stations 104 can then execute operation sequences according to the operation schedule, toward automating or otherwise accomplishing one or more physical processes. Each station 104 can execute the operation sequences independent from (e.g., even without any awareness of) other stations of the system. The controller 102 is able to utilize operation sequences to coordinate operation of multiple stations (e.g., multiple sets of robots) to accomplish complex physical processes. Thus, the individual stations 104 need not have awareness or understanding of the operation of other stations 104 in order to participate in automating or otherwise accomplishing a physical process.

Figure 2:
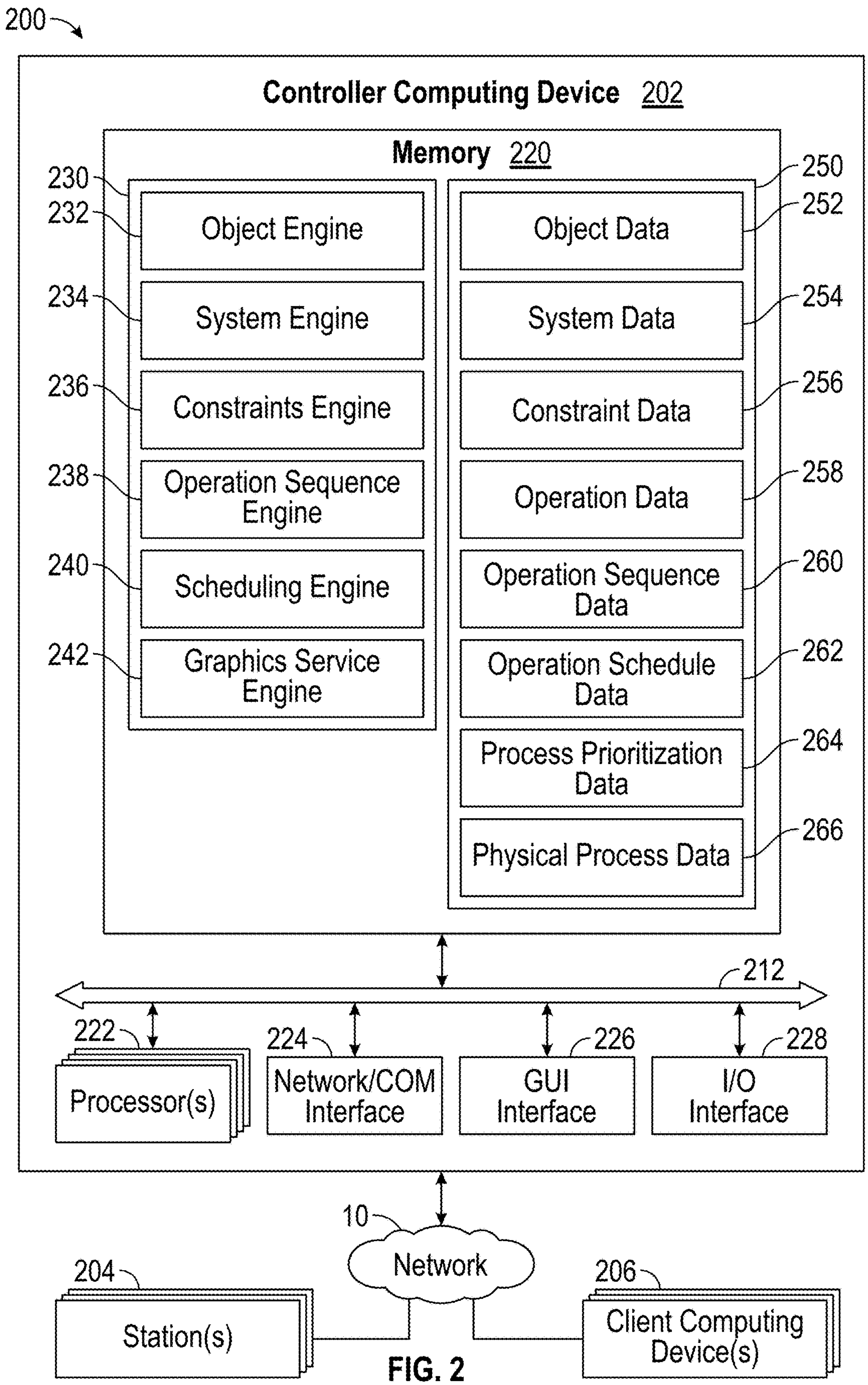
FIG. 2 is a diagram of an architecture of a system to accomplish a physical process, according to one embodiment of the present disclosure.

FIG. 2 is diagram of an architecture of a system 200 to automate or otherwise accomplish a physical process, according to one embodiment of the present disclosure. The system 200 may be similar, analogous, or identical to the system 100 of FIG. 1. The system 200 can in fact perform multiple physical processes as varied as snowflakes in the sense that each execution of a physical process is configured to accomplish the physical process with respect to an object. The object that is the subject of a physical process may have similarities to prior objects (and subsequent projects) and/or may be uniquely different. Similar to system 100 of FIG. 1, with appropriate sets of robots available to participate, the system 200 is designed to perform physical processes with respect to objects (e.g., physical structures) as varied as snowflakes. The physical process can include one or more of: constructing an object (e.g., a physical structure); deconstructing an object; inspecting at least a portion of an object; moving an object; integrating (e.g., mixing, coupling) constituent components of an object; and/or applying another object or element (e.g., paint, glue) to an object. The nature of the physical process is related to the sets of robots included in the system.

The system 200 includes a controller computing device 202 that is in communication with one or more stations 204 (e.g., sets of robots) over a network 10. The controller computing device 202 can include a memory 220, one or more processors 222, a network/communication interface 224, a GUI 226, and an input/output interface. The components of the controller computing device 202 may be interconnected via a bus 212. The system 200 may also include one or more client computing devices 206 from which input and other external data can be received.

The memory 220 may include, but is not limited to, static RAM, dynamic RAM, flash memory, one or more flip-flops, read-only memory (ROM), compact disc read-only memory (CD-ROM), digital video disc (DVD), disk, tape, or magnetic, optical, or another computer storage medium. The memory 220 may include a plurality of program modules 230 (or engines) and program data 250.

The program modules 230 (or engines) may include all or portions of other elements of the controller computing device 202. The program modules 250 may run multiple operations concurrently or in parallel by or on the one or more processors 222. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, causes a computing system to implement certain processing steps, procedures, and/or operations, as disclosed herein. The modules, components, and/or facilities disclosed herein may be implemented and/or embodied as a driver, a library, an interface, an application programming interface (API), field programmable gate array (FPGA) configuration data, firmware (e.g., stored on an electrically erasable programable read-only memory (EEPROM)), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, application-specific integrated circuits (ASICs), programmable logic controllers (PLCs), and/or the like. Accordingly, the modules disclosed herein may be referred to as controllers, layers, services, engines, facilities, drivers, circuits, and/or the like.

The system memory 220 may also include data 250. Data obtained or otherwise received by the controller computing device 202 and/or data generated by the controller computing device 202, such as by the program modules 230 or other modules, may be stored on the system memory 210, for example, as stored program data 250. The stored program data 250 may be organized as one or more databases.

The program modules 230 may include an object engine 232, a system engine 234, and constraints engine 236, an operation sequence engine 238, a scheduling engine 240, and a graphics service engine 242.

The object engine 232 receives and parses object data 252. The object data 252 pertains to an object that is the subject of a physical process. The object engine 232 can receive object data 252 in a variety of formats and/or file types and store the object data 252 in a suitable format in the memory. The object data 252 may describe or enable determination of the contours of the object, may describe interfaces of the object with other objects, and/or may describe or enable determination of constituent parts (or members) of the object and/or the interconnection of the constituent parts of the object. The object data 252 may specify points of the object that is the subject of the physical process, such as points in reference to three-dimensional Euclidean space (e.g., cartesian coordinates, polar coordinates) and/or in reference to an origin point. In some embodiments, the object data 252 may include object constraints, which may be requirements pertaining to the physical process in relation to the object. The object engine 232 receives and/or processes object data 252 as appropriate for the system 200 and/or stations 204 of the system and stores the object data 252 in memory for use in determining operation sequences and generation of operation schedules.

The system engine 234 can receive and/or read system data 254 to obtain information concerning the stations 204. The system data 254 may include data specifying characteristics of the system 200, and specifically the sets of robots of the stations 204. The system data 254 indicates capabilities of the stations. The system data 254 may indicate limitations or other constraints of the sets of robots of the stations 204. The system data 254 may be received by the system engine 234 from client computing devices 206, such as from manufacturers, integrators, sales representatives, or the like of a given robot or set of robots of a station 204 of the system. The system engine 234 can receive and/or read or otherwise process system data 254 and store it in the memory 250 in an appropriate manner for use by the system 200 in determining operation sequences and/or in generating an operation schedule. In some embodiments, system data 254 may be received as configuration files that are stored as system data 254 in memory 250. In still other embodiments, system data may be encoded (e.g., as class files or collections of instantiated variables) and stored in the memory 250 of the system and the system engine 234 can read or otherwise access the system data 252 to ascertain the characteristics of stations 204 for use by the system 200 in determining operation sequences and/or in generating an operation schedule.

The constraints engine 236 can glean and store in memory 250 constraints data 256 from the object data 252 and/or system data 254 that may be pertinent for generating operation sequences and/or operations schedules. The constraints engine 236 may also receive information from external sources from which constraint data 256 may be gleaned and stored as constraint data 256. The constraints engine 236 may receive constraints from the client computing devices 206. The constraints engine 256 can recognize, determine, and otherwise collect constraints of the system (including each robot of each set of robots of each station 204) and constraints of the object, which can be used by the system 200 to determine and validate operation sequences and/or to generate and validate an operation schedule.

The operation sequence engine 238 may determine one or more operation sequences, based on one or more of object data 252, system data 254, and constraint data 256, and may store the one or more operation sequences in memory 250 as operation sequence data 260. In some embodiments, the operation sequence engine 238 may determine operations of one or more robots and/or one or more sets of robots of the stations 204 and store those operations in memory 250 as operation data 258. In some embodiments, the system 200 may receive or otherwise have stored in memory operation data 258, such as from an external source (e.g., the client computing devices 206). The operation sequence engine 238 may reference or otherwise access the operation data 258 to determine operation sequence data 260. More specifically, the operation sequence engine 238 may determine an included operation sequence and derive the physical operations (e.g., actions of individual robots) to be performed in a sequence in order to accomplish at least a portion of the physical process. The operation sequence engine 238 can derive an operation sequence and the operations included therein by determining individual operations (e.g., actions) of a robot to perform in a sequence of multiple operations. The process by which the operation sequence engine 238 may determine an operation sequence is described more fully below with reference to FIG. 4. The operation sequences can be used to determine an operation schedule.

The scheduling engine 240 can generate an operation schedule, utilizing the operation sequence data 260 and based on one or more of object data 252, system data 254, and constraint data 256, and may store the operation schedule in memory 250 as operation schedule data 260. The scheduling engine 240 may generate an operation schedule by queuing operation sequences for one or more of the stations 204. The operation sequences may be queued according to process prioritization data 264. The process prioritization data 264 may provide a priority or other desired ordering for different physical processes and/or objects that are subject thereto. The process prioritization data may be received (e.g., from a user) or otherwise derived from the object data 252, system data 254, constraint data 258, operation data 260, and/or operation sequence data 260. The scheduling engine 240 may generate the operation schedule by queuing the operation sequences according to the process prioritization. The scheduling engine 240 may store the operation schedule in the memory 250 as operation schedule data 264. The process by which the scheduling engine 240 may generate an operation schedule is described more fully below with reference to FIG. 5. The operation schedule data 262 may include queues of operation sequences, such as a queue for each of the one or more stations 204 and other timing and coordination information to coordinate operation of the stations 204 to automate or otherwise accomplish one or more physical processes. The resulting one or more queues from the queuing of operation sequences can provide an operation schedule specifying timing of performance of each operation sequence (of the one or more operation sequences) and a station (set of robots of the one or more sets of robots) to perform each operation sequence. The operation schedule data 262 may include an operation schedule for one or more physical processes.

The scheduling engine 240 may also generate physical process data 266 to distribute to the one or more stations 204. The operation schedule (e.g., the queued operation sequences) can be formatted as according to specified in the system data for a given station or otherwise generated into physical process data for transmission or other communication to each station. The physical process data 266 may be distributed to (e.g., pushed) or requested (e.g., a pull) by the one or more stations 204. In an embodiment that includes pushing physical process data 266 to the one or more stations 204, each given station 204 may receive the entire operation schedule or a portion of the operation schedule (e.g., the operation sequence(s)) pertinent to (e.g., to be performed by) that given station 204. In an embodiment that includes the stations 204 pulling the controller 202, as a station 204 completes an operation sequence, the station 204 can inquire of or otherwise alert the controller 202 to provide an additional operation sequence to be the newly available station 204.

The graphics service engine 242 may generate, for example, graphical representations for GUIs, as these are described herein (such as, e.g., the GUI 226). It is contemplated that any of the data 250 may act as a data source for the graphical representations to be generated by the graphics service engine 242.

As can be appreciated, the system 200 of FIG. 2 is one embodiment and in other embodiments the components, including the modules 230 and data 250 may be organized or arranged differently than shown and be consistent with the scope of the present disclosure and can perform the operations and processes within the scope of the present disclosure.

Figure 3:
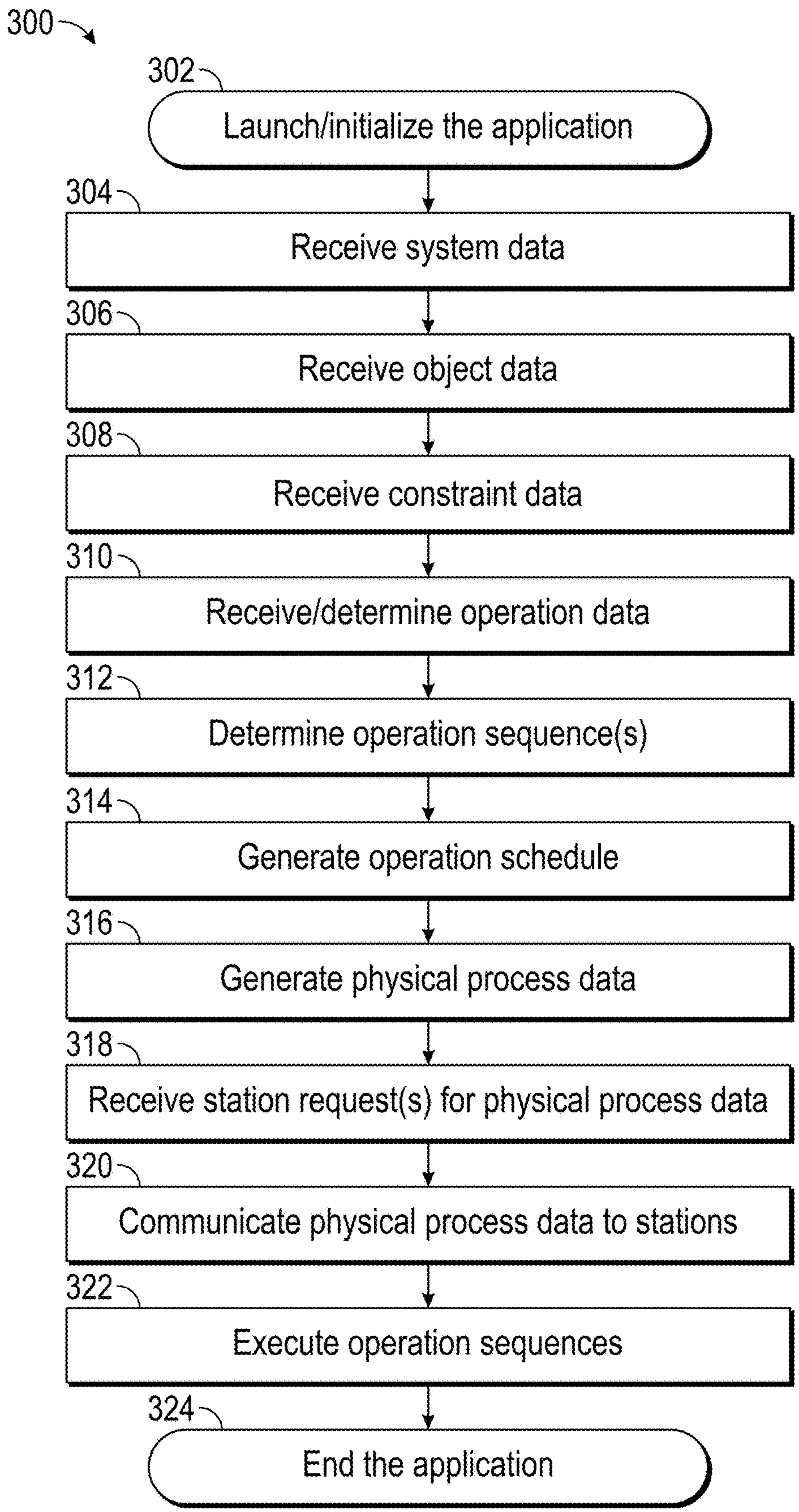
FIG. 3 is a flow diagram of a method to accomplish a physical process, according to one embodiment of the present disclosure.

FIG. 3 is a flow diagram of a method 300 to automate or otherwise accomplish a physical process, according to one embodiment of the present disclosure. The embodiment of FIG. 3 illustrates a process that may be performed by a system to automate or otherwise accomplish one or more physical processes, such as the system 100 of FIG. 1 or the system 200 of FIG. 2. The system may launch 302 or otherwise initialize the application to implement the method 300 to coordinate automating the physical process(es).

System data is received 304, which may include receiving data providing one or more system characteristics. The system characteristics provided in the system data may specify one or more of system capabilities and system constraints for a system to accomplish the physical process (or at least a portion of the physical process). In some embodiments, system data may be received with a particular physical process to be performed. In other embodiments, system data may be obtained or otherwise received from a set of robots when added to the system to accomplish a physical process. In some embodiments system data may be obtained or otherwise received from an external source, such as from a manufacturer of a robot or an electronically accessible data source. In some embodiments, system data may be received as configuration files. In still other embodiments, system data may be encoded (e.g., as class files or collections of instantiated variables) in a nonvolatile and/or non-transitory memory of the system. For example, the system may receive a listing of compatible robots and the associated system data for such robots and the appropriate system data is received 302 for all such potentially compatible robots, regardless of whether such robots are presently included in the system.

The system data may include system data for one or more robots, one or more sets of robots, and/or one or more areas (a set of one or more sets) of robots. Stated otherwise, the system data may include system data at one or more levels of organization (e.g., an individual robot level, a set-of-robots level, a set-of-sets level). The system data may also set forth or otherwise indicate an organization or architecture of a system to accomplish a physical process.

The system data may include one or more identifiers for each robot or set of robots. The identifier may be a number, code, descriptor, or the like to indicate that a robot is of a particular type that can be matched as compatible with the system. For example, the identifier may indicate that a robot is a saw, or a press, or a conveyor, or a six-axis robotic arm. The one or more identifiers may indicate other identifying information, such as a manufacturer and/or a make/model. For example, an Alpine® saw may be identified differently than a MiTek® saw.

The system data may include an origin point for each robot or set of robots. The origin point provides a point from which action (operations) of the robot can be referenced and instructed. The origin point may be a main origin point, or an origin point referenced to a main origin point. In some embodiments, the system data may include an offset from an origin, the offset similarly providing a point from which action (operations) of the robot can be referenced and instructed.

The system data may include system characteristics for one or more robots of the one or more sets of robots. The system data may also include system characteristics for each robot in each set of the one or more sets of robots. The system characteristics may specify system capabilities. For example, the system data may include a listing of operations (e.g., move, grip, lift, cut, apply) for each robot or set of robots. The listing of operations of a robot or set of robots may specify, identify, or otherwise inform the system as to the capabilities of each robot and can vary widely from one robot to another. For example a saw may have a limited listing of operations (e.g., cut, angle blade, rotate blade) as compared to a listing of operations of a six-axis robotic arm (e.g., grip, lift, rotate base, move lower arm, move upper arm, rotate upper arm, move wrist, rotate wrist, end-of-arm tool operation).

The system characteristics may specify system constraints. The constraints may indicate limitations of the robot. For example, a robot may have a weight limit that it can lift, or a reach limit that it can reach. As can be appreciated, in some instances the constraints may be expressed as capabilities (e.g., the robot has a six-foot reach), but nevertheless it cannot perform actions beyond such capabilities and are thus constraints. In some instances, operating environments may present constraints. For example, a robot may be limited in a particular range of motion due to another robot, the ceiling of the environment, a wall, a table, or other object. The system characteristics may include a listing of constraints against which a validation process can be run to confirm operation sequences comply with system constraints.

In some embodiments, system constraints may be received separately from the system data. The separately received system constraints may provide an avenue for providing input as to the performance or execution of the physical process. System constraints may be provided separately from the system data, for example, to indicate environment or physical constraints in the physical environment, such as obstructions, walls, ceilings, shelving, or the like that may be known to someone with knowledge of the environment and may not be inherent to the system and capabilities of the system.

The system data may include indication of expected input data type. Different robots of the one or more sets of robots may expect to receive instructions in varying formats. The system data may indicate a particular file type, or may specify data format, such as comma separated fields, sections or blocks of a document, meta data tags to include, and the like. An objective of the method is to provide instructions to each robot and/or set of robots of each station of the system in a manner that is expected/useable by that respective robot and/or set of robots. For example, a cutting station (e.g., a saw) may need a different type of input or instructions to perform operations than the type of input that a six-axis robotic arm might expect. The method can produce output in many different formats and ways, depending on and/or according to requirements of the robots and/or stations and the capabilities to read or otherwise process data.

The system data may provide positioning of each robot of a set of robots that are included in the system and capable of performing the operation sequence. For example, a system to automate the physical process of building a truss may include a truss assembly station, which can include an assembly table that has pins that move to form a template into which the truss members are placed for the assembly of the truss. The size of the pins, their location on the table, the range they can travel on the table, and direction of travel all can be important system data in generating operation sequences, and operation schedule, and physical process data to instruct the truss assembly station.

The method 300 can include receiving 304 the system data of any type to provide a controller of the system an awareness of the capabilities and constraints of robots and sets of robots (e.g., stations) included with or otherwise available to the system.

Object data is received 306 for an object that is the subject of the one or more physical processes to be automated or otherwise accomplished by the system. The object can be any tangible of physical thing. In some embodiments, the object data may be received 306 with a physical process to be performed. In some embodiments, the object data may be received 306 and then the physical process to be accomplished may be derived from the object data.

The object data may be data from which information about a physical object (e.g., any tangible thing existing or to be created in physical space) may be ascertained by a system to accomplish a physical process. The object data may describe or enable determination of the contours of an object. The object data may describe interfaces of the object with other objects. The object data may describe constituent parts (or members) of the object and/or the interconnection of the constituent parts of the object. The object data may specify points of the object that is the subject of the physical process. The points of the object may be provided with reference to an origin point. The origin point in some embodiments may be a main origin point. The origin point in some embodiments may be a relative origin point that is defined in relation to another origin point, such as a main origin point. Examples of object data may include, but certainly are not limited to, a TRE file (by MiTek Industries Inc.), a STEP file or similar computer-aided design (CAD) file, a JSON file, a CSV file, and an XML file. The system can also be taught or otherwise configured to receive any custom data format for object data.

In some embodiments, the object data may specify all the points of an object, such as in a digital model of an object as may be generated by a CAD package. In some embodiments, the object data may specify relevant points of an object, which may be relevant to the physical process to be accomplished. For example, the object data may specify joints of members (or components) to be connected or otherwise coupled. As another example, the object data may specify a portion of an object and the portion may be relevant to an inspection.

In some embodiments, the object data may include object constraints. The object constraints may be requirements pertaining to the physical process in relation to the object. Examples of object constraints may include maximum/minimum dimensions and/or maximum/minimum weight, location of the constituent parts of an object in relation to other constituent parts in the object (e.g., to be able to determine if the system can perform operations on or with each part without other parts causing interference), and valid uses/purposes of materials and other constituent parts.

An illustrative example of a constraint, as to a valid use of materials, pertains to building (a physical process) a wall (an object). When building a wall in standard construction practices, a single 2×4 can be used under a seam where 2 plates come together (e.g., the plates are nailed to the 2×4 to connect them). In automation this connection may be too weak to hold up to the process of conveying a wall through the system and may rip apart. Accordingly, for automation, a constraint can indicate that a 3×4 board is to be used (or even required) to join a seam.

In some embodiments, object constraints may be received separately from the object data. The separately received object constraints may provide an avenue for providing input as to the object that is the subject of the physical process, and thereby provide input as to execution of the physical process. For example, if the object is to be later integrated as part of another more complex object the object constraints may provide requirements (e.g., tolerances, size constraints, interface materials, etc.) on the object to be able to interact and/or otherwise appropriately interface with other objects within the more complex object.

The method 300 includes receiving 306 the object data for the object that is the subject of the physical process to be automated or otherwise accomplished. With the object data, the method 300 can include informing (e.g., configuring, instructing) sets of robots of the system to execute operations in relation to the object.

Constraint data can also be received 308 that indicates constraints on the system and/or constraints on the object. The constraints provide criteria against which validation of operation sequences may be performed. The constraint data may be received 308 with the system data and/or object data. The constraint data may alternatively or additionally be received 308 separately from system data and object data. The constraints may be inherent constraints (e.g., robot constraints, material constraints, object constraints). The constraints may be externally composed constraints (e.g., the environment of the system, requirement(s) imposed on the object). The method 300 may include receiving constraint data to provide the system additional context within which to automate or otherwise accomplish the physical process to which the object is subject.

The method 300 may also include receiving 310 or otherwise determining operation data. The operation data may be received as a data input or may be determined based on the system data and/or object data. The operation data may include one or more possible/needed physical operations that the system is capable of performing according to the one or more robots of the one or more sets of robots of the stations. The physical operations that need and/or can be performed by the system may be determined as a precursor or as a part of determining 312 one or more operation sequences. It is contemplated that in some embodiments, the physical operations may be received 310 as operation sequences.

One or more operation sequences may be determined 312 (e.g., generated and/or modified) with an intent that execution of such operation sequence can be done by a set of one or more robots to accomplish a portion of a physical process with respect to an object. Each operation sequence of the one or more operation sequences provides an ordering of a set of physical operations. The set of physical operations may be associated with one or more points of the object. Moreover, each of the one or more operation sequences 312 may be determined in a manner to be discrete from other of the one or more operation sequences. Stated otherwise, execution of an operation sequence may be accomplished by a set of one or more robots of a station without awareness or other regard to another set of one or more robots of a different station. A process of determining operation sequences is discussed more fully below with reference to FIG. 4.

An operation schedule may be generated 314 to indicate an ordering and/or a timing for execution of one or more operation sequences and a set of robots of one or more sets of robots to perform each operation. This timing may be an actual timing. In other cases, this timing may be relative to another operation sequence (e.g., the timing may be an indication that the execution of an operation sequence begins after a prior operation sequence in an ordering begins, is completed, and/or reaches a certain stage). In some embodiments, the operation sequences may be generated so as to be executed by a particular set of robots. A system to automate or otherwise accomplish a physical process, however, may have multiple sets of robots (e.g., stations) that are capable of performing identical operations. As an example, a system to assemble a teddy bear may include multiple appendage assembly stations to assemble appendages of a teddy bear, because it may be that, for example, four appendages need to be assembled for each body and each head that are assembled. It may be that each appendage assembly station can assemble arms (left or right) and legs (left or right), and the operation schedule can order and/or indicate timing (relative or actual) of each appendage station executing an operation sequence to assemble an appendage. In one simple embodiment, the operation schedule may be generated 314 as a set of one or more queues of operation sequences. In one embodiment, a single queue may provide the entire operation schedule. In another embodiment, a queue may be allocated for each station. In still another embodiment, a queue may be allocated based on a type of operation sequence to be performed (e.g., a queue for each of head assembly, body assembly, and appendage assembly for a physical process of assembling a teddy bear). In still another embodiment, the operation schedule may be a more complex set of instructions specifying specific stations and specific timing. The method 300 includes generating 314 an operation schedule that indicates an ordering and/or a timing for execution of operation sequences so as to coordinate a collaboration of multiple robots and sets of robots (or stations) to automate or otherwise accomplish one or more physical processes. The operation schedule can be formatted as specified in the system data for a given station or otherwise generated 314 into physical process data for transmission or other communication to each station, as previously described.

The operation schedule can be transformed or otherwise used to generate 316 physical process data that can be received and used by the robots of the stations to execute an operation sequence toward automating or otherwise accomplishing a physical process with respect to a particular object. The physical process data can be particular (e.g., unique, custom) to the physical process, the object that is the subject of the physical process, and/or the robots or sets of robots (e.g., stations) of the system. In some embodiments, the physical process data can be generated 316 such that each robot, or each set of robots, receives the entire operation schedule. In some embodiments, the physical process data can be generated 316 such that each robot, or each set of robots, receives only relevant operation sequences and timing information (if any). Stated otherwise, the physical process data can be generated 316 to provide each robot, or each set of robots, only the specific scheduling information for that robot or set of robots to perform the operation sequence according to the operation schedule.

In some embodiments, the operation schedule may be prepared and/or provided according to a data format that may be expected or otherwise needed by the robot or set of robots of a station that performs the operation sequence, such as comma separated fields, sections or blocks of a data file, meta data tags, and the like. Stated otherwise, the operation schedule can be prepared or otherwise provided in a variety of ways according to needs, expectations, and/or requirements of the system.

In some embodiments, requests for physical process data may be received 318 from the stations. The communication protocol may anticipate that stations notify a controller computing device when they have completed an operation sequence or a portion of a sequence. The station may indicate to the controller that a robot (e.g., the initial robot in a sequence) or set of robots (e.g., the station) is available to begin performing actions and awaits instructions.

The physical process data is then communicated 320 to the stations. In some embodiments, the physical process data is communicated 320 to each station in response to a request (e.g., a pull) from the station. In other embodiments, the physical process data is communicated 320 (e.g., pushed) to the station as the system (e.g., a controller) is prepared to communicate, which may be when the operation schedule is completed and the physical process data is prepared, or may be anytime thereafter, such as according to a timing specified in the operation schedule. As previously explained, the physical process data can be communicated in any format acceptable to a station.

A variety of modes of communicating 320 the physical process data are possible. The physical process data may be communicated 320 electronically, such as over a network, as illustrated in FIG. 1. The network may be a wired or a wireless network. The physical process data may be communicated 320 electronically via other wireless protocols, such as via Bluetooth. The physical process data may be communicated 320 electronically via other media, such as a physical media (e.g., CD ROM, USB flash drive).

With physical process data distributed, one or more of the stations have one or more operation sequences that can be executed 322 to participate in or otherwise contribute to automating or otherwise accomplishing the physical process with respect to the object. The method 300 can include executing 322 the operation sequences according to the operation schedule. And then the application can end 324.

As can be appreciated, the method 300 can be repeated or cycled to accomplish multiple physical processes. Each repetition (or cycle) of the method 300 may be, in essence, for a unique physical process pertaining to a unique object. As can be appreciated, in a set of multiple objects, there can be substantially identical objects, such that substantially the same physical process is automated or otherwise accomplished. The method 300 (and embodiments of systems herein that can implement the method) can handle both identical cycles (e.g., cycles that each accomplish the same physical process) and fully unique cycles (e.g., cycles that accomplish different physical processes). The cycles of the system automating or otherwise accomplishing physical processes can occur in relatively rapid succession. Stated otherwise, the method 300 can be cycled on a system in relatively rapid succession without any need of human involvement to re-program or otherwise re-configure any robot or set of robots of the system.

Figure 4:
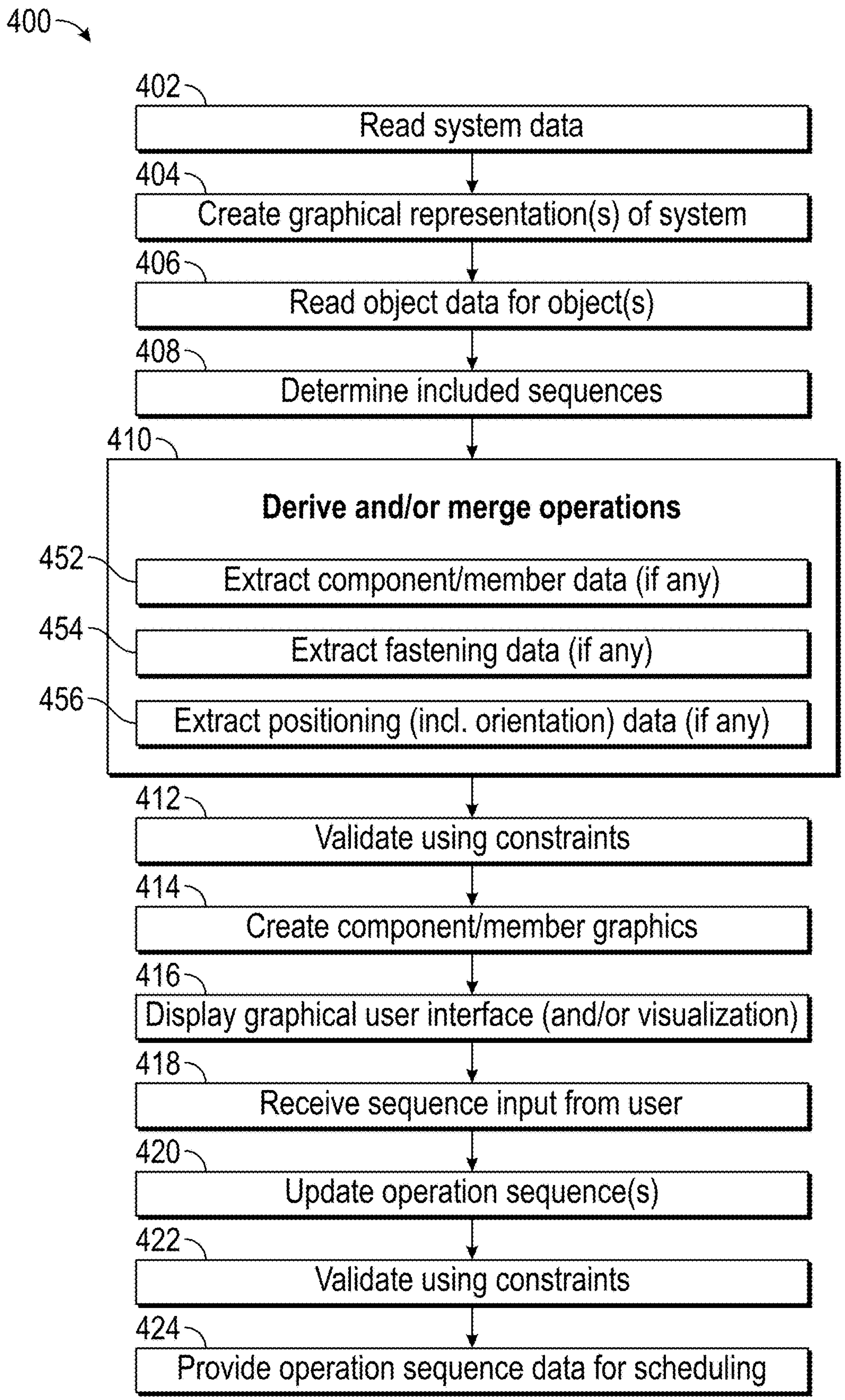
FIG. 4 is a flow diagram of a method of determining one or more operation sequences, according to one embodiment of the present disclosure, to accomplish at least a portion of a physical process.

FIG. 4 is a flowchart of a method 400 of determining one or more operation sequences, according to one embodiment of the present disclosure. Each of the one or more operation sequences is to accomplish at least a portion of a physical process. The method 400 may be executed or otherwise performed by a system to accomplish a physical process (e.g., the system 100 of FIG. 1).

The method 400 may include reading 402 (e.g., obtaining or otherwise receiving) system data, which may include one or more system characteristics specifying one or more of system capabilities and system constraints for a system to accomplish the physical process (or at least a portion of the physical process). The system data may have been previously received as explained above with reference to FIG. 3, such as in conjunction with an object and/or a physical process. In other embodiments, the system data may be encoded (e.g., as class files or collections of instantiated variables) in or stored on a nonvolatile and/or non-transitory memory of the system or otherwise available to the system, because the system is compatible with or otherwise known to include one or more robots or sets of robots (e.g., stations). For example, the system may include a listing of compatible robots and the associated system data for such robots and the appropriate system data is read 402 for the robots that are presently included in the system.

The system data may include system data for one or more robots, one or more sets of robots, and/or one or more areas (a set of one or more sets) of robots. Stated otherwise, the system data may include system data at one or more levels of organization (e.g., an individual robot level, a set-of-robots level, a set-of-sets level). The system data may also set forth or otherwise indicate an organization or architecture of a system to accomplish a physical process. The system data may include system characteristics for one or more robots of the one or more sets of robots. The system data may also include system characteristics for each robot in each set of the one or more sets of robots. The system characteristics may specify system capabilities. The system characteristics may specify system constraints. The reading 402 of the system data may glean information that can be used to determine operation sequences.

Graphical representation(s) of the system may be created 404 and/or otherwise provided for rendering on a display device. A graphical representation may include a graphical representation for each set of robots of a system. A graphical representation may include a graphical representation for each robot in each set of robots. The graphical representation(s) of the system may be created 404 for user interaction in providing input for automating a physical process, as described more fully below. The graphical representation may display system data. The graphical representation may allow providing, configuring, and re-configuring of system data. The graphical representation may also allow for providing validation feedback to show graphically what parts of a system design or object design prevent the accomplishment of the physical process by the system and why.

The method 400 may include reading 406 object data for an object (e.g., a physical structure) that is a subject of the physical process to be accomplished. As previously described, the object data may be received with a physical process to be performed. Or object data may be received, and a physical process may be derived from or based on the object data. The object data may be data from which information about a physical object (e.g., any tangible thing existing or to be created in physical space) may be ascertained by a system to accomplish a physical process. The object data may describe or enable determination of the contours of an object. The object data may describe interfaces of the object with other objects. The object data may describe constituent parts (or members) of the object and/or the interconnection of the constituent parts of the object. The object data may specify points of the object that is the subject of the physical process. The points of the object may be provided with reference to an origin point. The origin point in some embodiments may be a main origin point. The origin point in some embodiments may be a relative origin point that is defined in relation to another origin point, such as a main origin point. The object data can be received in a variety of commonly understood formats and the system can also be taught or otherwise configured to receive any custom data format for object data.

One or more needed operation sequences may be identified 408 from the object data, as part of the method 400. For example, if the object data is for a teddy bear, the method 400 may identify 408 that a body assembly operation sequence, four appendage assembly operation sequences (which may be identical), and a head assembly operation sequence are needed. Alternately, for another type of teddy bear or other stuffed animal, the method 400 may identify 408 that a body assembly operation sequence, a pair of arm assembly operation sequences (which may be identical), a pair of leg assembly operation sequences (which may be identical), and a head assembly operation sequence are needed. As another example, if the object data is for a truss, the method 400 may identify 408 that a cutting operation sequence, a pre-plating operation sequence, and an assembly operation sequence are needed. The needed operation sequences may be identified 408 based on intersection points within the object data, location of constituent parts of the object, position and/or orientation of constituent parts in relation to other constituent parts, material of components, dimensions, and other physical properties.

As can be appreciated, the needed operation sequences may alternately or in addition be identified 408 from system data. The system data may indicate one or more sets of robots, or even one or more areas (one or more sets) of robots that may be arranged, configured, or otherwise capable of performing operations of a sequence. For example, in the case that the object data pertains to a teddy bear, the system data may indicate one or more sets of robots (or areas of robots) that are available to perform an operation sequence of the physical process of making the teddy bear. In such a case, the system data may indicate a first set of robots representing a body station that can assemble a body of the teddy bear, a second set of robots representing a head station that can assemble a head of the teddy bear, and a third set of robots representing of an appendage station that can assemble an appendage (e.g., an arm and/or a leg) of the teddy bear. Based on the indicated set(s), area(s), etc. of robots, one or more needed operation sequences may be identified.

As another example, in the case that the object data pertains to a truss that is a subject of a physical process for assembling the truss, the system data may indicate a set of robots of a cutting station (e.g., an infeed robot, a saw, and an outfeed robot) that is available to provide cutting, such as may be used to cut or shape members to be used as part of the truss. The system data may also indicate a set of robots for a plating station (e.g., an infeed robot, a plate picker, a press, and an outfeed robot), such as may be used to pre-plate truss members. The system data may also indicate a set of robots for an assembly station (e.g., a robotic arm to position truss members, an assembly table with positionable pins to arrange truss members), such as may finally assemble cut and pre-plated members of the truss. Based on the indicated set(s), area(s), etc. of robots, one or more needed operation sequences may be identified. Accordingly, the system data may indicate, determine, or otherwise influence an identification 408 of the needed operation sequences, as appropriate for the object of the object data.

Each of the one or more needed operation sequences may be identified 408 in a manner to be discrete from other of the one or more operation sequences. Stated otherwise, the needed operation sequences may be determined (e.g., generated, modified, and otherwise instantiated) such that execution of an operation sequence may be accomplished by a set of one or more robots of a station without awareness or other regard to another set of one or more robots of a different station.

In some embodiments, identifying 408 needed operation sequences may include creating sections from the object data. Each section may correspond to, e.g., members, fasteners, or other categories of components or constituent parts of an object.

In some embodiments, identifying 408 the needed operation sequences may include deriving or otherwise determining the operations of each included sequence. In other embodiments, the actual operations for each included sequence may be derived 410 or otherwise determined as a next step in the method. The distinction may be pronounced or may be merely semantics. For sake of illustration, FIG. 4 depicts identifying 408 the needed operation sequences and deriving 410 the operations of each included sequence as separate steps, but these could similarly be combined as will become apparent.

The operations of the included sequences may be derived 410 as part of the method 400. Deriving 410 operations may include determining individual operations (e.g., actions) of a robot to perform in a sequence of operations. In some embodiments, operations may be derived 410 from or based on the object data (e.g., a body of a teddy bear is to be cut, stitched, and stuffed). Operation data for a plurality of physical operations (to be performed by one or more robots to accomplish the physical process) may be extracted from the object data. Operations may be derived 410 to create a set of operations for which an ordering is provided by an operation sequence. One or more operations of an operation sequence may be from a plurality of physical operations that can be derived from operation data.

In some embodiments, operations may be derived 410 based on the system data (e.g., the body of a teddy bear can be cut by a cutting station, stitched by a stitching station, and filled by a filling station). In some embodiments, operations may be derived 410 from a template (e.g., as a general matter a cutting station may input material, cut the material, and output the material).

In some embodiments, operations may be derived 410 by merging in or otherwise incorporating (into an operation sequence) operations data received for a plurality of physical operations to be performed by the one or more sets of robots to accomplish the physical process. For example, some object data for trusses may be accompanied by initial operation data, which may provide, for example, an initial ordering of one or more physical operations for assembling the truss. The method may include deriving 410 operations for an operation sequence by merging in or otherwise integrating such initial operations data received at the system. The merging in or otherwise integrating initial operations data may include associating each of one or more points of an object with one or more physical operations based on the object data and the operation data. This merging may take place by referring to a component (or member) label in, for example, an input file containing a cutlist sequence for a saw of a shaping station and associating it with a (potentially different) label for the same member in object data. As another example, this merging may include associating fastener data from object data with fastener data from operation data, such as through associating a label for a fastener from one input file with a (different) label for the same fastener in a second input file. This merging process may also (or alternatively) include converting a value representing an angle at which a fastener should be attached to a member from on input file to a value for that angle that may be expected by the assembly system.

Deriving 410 operations of one or more operation sequences may involve various aspects. FIG. 4 illustrates examples of ways the method 400 might derive operations of the operation sequences. In some embodiments, component/member data may be extracted 452 or otherwise gleaned. A component (or constituent part) may be an acknowledged or otherwise recognized discrete part (e.g., a fastener, a piece of material) of the object, akin to at a commodity level. A member may be considered as one or more components and yet is also a part (e.g., a head of a teddy bear, a chord, or web of a truss) of an object. (The term "component/member" is used herein to indicate either or both discrete components (constituent parts) and more general members (one or more components) and to describe concepts that can be applicable over a range of complexities of parts of an object.) Component/member data may be extracted 456 or otherwise gleaned from the object data. The component/member data may include component/member type, vertices, raw dimensions, label, material, etc. For example, in the case that the object that is the subject of the physical process is a teddy bear, the components may include the individual pieces of fabric that form a head, each appendage, and a body. In the case that the object is a truss, the components or members that can be extracted 452 include the chords and webs of the truss. In the case that the physical process is to create a stack of objects (e.g., sacks of produce, boxes), and the object data is for a single object, each object may not have constituent parts that are relevant and there is no need and/or ability to extract 452 component/member data. In the case that the object data describes the ultimate stack of objects, the individual objects (e.g., boxes, sacks) of the stack may be extracted from the object data. In some embodiments, component/member data may alternatively or in addition be extracted 452 from operation data received, in a manner that enables associating each of the one or more points of the object with one or more physical operations of a set of physical operations based on the object data and/or the operation data. The method may use the component/member data in deriving 410 the operations of the included operation sequences.

In some embodiments, fastening data may be extracted 454 or otherwise gleaned. Fastening data may be extracted 454 or otherwise gleaned from the object data. Fastening data can include fastener type, x and/or y location of a joint associated with a fastener, a quantity of a fastener type, gauge of a fastener, etc. For example, in the case the object is a teddy bear, specs (size/type/quality) and positioning of stitching, glue, and zipper data may be extracted from the object data. In the case of a truss, fastening data may be extracted 454 for nail plates at the joints of the truss, and may include the size of the nail plates location/orientation relative to members to be joined. In the case that the physical process is to create a stack of objects (e.g., sacks of produce, boxes), fastening data may pertain to shrink wrap, or fastening data may be irrelevant and thus there is no need and/or ability to extract fastening data. In some embodiments, fastening data may alternatively or in addition be extracted 454 from operation data received, in a manner that enables associating each of the one or more points of the object with one or more physical operations of a set of physical operations based on the object data and/or the operation data. The method may use the fastening data in deriving 410 the operations of the operation sequences.

In some embodiments, positioning data may be extracted 456 or otherwise gleaned. Positioning data may be extracted 456 or otherwise gleaned from the object data. Positioning data may include positioning in three-dimensional space (e.g., cartesian coordinates), such as to indicate, for example, the position of the teddy bear's head in relation to an origin point and/or in relation to the teddy bear's body. Positioning data can include orientation data, such as to indicate the teddy bear's arm is rotated slightly forward relative to the teddy bear's body rather than rotated slightly behind the teddy bear's body.

By way of examples of positioning data, in the case that the object is a teddy bear, positioning data may indicate joints or intersections of different components/members of the teddy bear, such as positioning of pieces of fabric relative to other pieces of fabric, and positioning of the appendages and head relative to the body, including orientation of the head and appendages relative to the body. In the case of the object being a truss, positioning data may be extracted 456 for members (e.g., chords and webs) and for nail plates at the joints of the truss and orientation of the nail plates relative to the truss members (e.g., which surface of the members the plate is applied). In the case that the physical process is to create a stack of things (e.g., sacks of produce, boxes), positioning data may pertain position of, for example, sacks/boxes within the stack and the orientation of the sack/box (e.g., orientation of a side that is longer than another). In the case that the physical process is inspecting (e.g., quality assurance) an object or applying something (e.g., paint, glue, adhesive, sealant) to an object, positional data may indicate a location of the object in the physical space and a location of a portion (e.g., component/member, joint, application area) of the object where the inspection or application is to occur. In some embodiments, positioning data may alternatively or in addition be extracted 456 or otherwise gleaned from operation data received, in a manner that enables associating each of the one or more points of the object with one or more physical operations of a set of physical operations based the object data and/or the operation data. The method 400 may use the positioning data in deriving 410 the operations of the operation sequences.

As can be appreciated, deriving 410 operations of operation sequences can include or otherwise involve extracting or otherwise gleaning a variety of different types of data or information, and is not limited to strictly component/member data, fastening data, and positioning data. The method 410 may extract or otherwise glean any available data or information from the object data and any operation data to derive 410 the operation sequences.

The derived 410 operations may include individual actions for each robot of a set of robots to perform in a sequence of operations.

The method 400 may include validating 412 the operation sequences based on constraints. As previously described, constraints may be received with or otherwise included in object data (e.g., object constraints) and system data (e.g., system constraints). Further, additional constraints may be provided separate from object data and system data, for example, as an avenue for providing input as to the object that is the subject of the physical process and/or input as to the environment of executing the physical process, thereby providing input as to execution of the physical process. Validating 412 the operation sequences based on the constraints includes ensuring that the operations of each of the operation sequences complies with the pertinent constraints. Examples of constraints may be, for example, ensuring that an structural component and/or an object to be assembled is of a size that can be assembled by the system (e.g., that it will fit on an assembly table, and/or can be handled (lifted, gripped, moved) by the robots of the system, etc.) and/or of a type that can be assembled by the system (e.g., that it will be made of material with which the system is configured to operate and/or that the system is presently stocked with). Further examples may be ensuring that pathways of movement used by/in/as part of the operation sequence(s) of are clear of obstructions and able to be executed by a respective robot.

In the case of stuffed animal assembly, a further example of constraints may be checking whether the implementation of first operations sequence(s) that provide an output on which a second operation sequence depends will generate that output prior to its use in the second operation sequence (for example, whether a head generated at a head station according to a head station operation sequence will finish being assembled at the stage where a body station is to attach the head to the body as indicated for in a body station operation sequence).

In the case of structural component assembly, further examples of constraints may be checking whether one or more members of a structural component is too small or too large to be shaped at a shaping station, whether one or more fasteners being attached to members at a fastening station will have sufficient surface area contact with the associated member to successfully be pre-fastened, and/or whether first operations sequence(s) that provide an output on which a second operation sequence depends will generate that output prior to its use in the second operation sequence (for example, whether a plated member generated at a plating station according to a plating station operation sequence will be finalized and available at the stage where an assembly station is to use the plated member as indicated for in an assembly station operation sequence).

Graphical representation(s) of the components/members may be created 414 and/or otherwise provided for rendering on a display device. A graphical representation may include a graphical representation for each component/member of an object. The graphical representation(s) of each component/member may be created 414 for user interaction in providing input for automating a physical process, as described more fully below. The graphical representation may display object data. The graphical representation may enable manual adjustment or other input for operation sequences and may allow for providing validation feedback graphically (e.g., to show graphically what parts or aspects of the system or object may prevent the automation or accomplishing of the physical process).

A GUI may be displayed 416 providing one or more of graphical representations of the system and component/member graphics. The GUI may provide, for a user, a visualization of the system, the object, and/or the operation sequences.

Sequence input may be received 418 from a user. The operation sequences may be displayed as part of the display 416 of the GUI, or may otherwise be made available, such as for user review. A user may have additional knowledge, experience, and/or understanding in relation to the physical process and/or the object that is the subject of the physical process, and may desire to adjust, refine, change, or otherwise alter an operation sequence. Accordingly, user input can be received 418 to revise the operation sequence(s). The user input may be received as user instructions to re-order operations the system previously derived 410. The method 400 may include updating 420 the operation sequence(s). This updating 420 may include adding an operation to an operation sequence, removing an operation from an operation sequence, and/or reordering existing operations of an operation sequence. These actions may affect an assembly order of members of a structural component being assembled by a sequence of operations and/or a physical process (and correspondingly may also have an effect on other operation sequences).

The updated operation sequence(s) may again be validated 422 using the constraints. This validation 422 may ensure that, for example, actions of robots to perform the operations in each operation sequence is not physically impossible (e.g., due to any obstruction or a system constraint). Some or all of the previous constraint checks already run during the method 400 to validate 412 the operation sequences may be re-run at this stage. Any re-run of a previous constraint check may be at least partially in response to (and/or take into account) any new or updated sequence of operations.

A result of the method 400 is operation sequence data for each set of robots (or areas of robots). The operation sequence data can be provided 424 and used by the system to schedule various sets of robots (e.g., stations) to perform the physical process with respect to the subject object. The operation sequence data can be provided 424 according to a format or otherwise in a form expected by each set of robots (as may be indicated in the system data). In some embodiments, the operation sequence data may be prepared and/or provided 424 according to a data format that may be expected or otherwise needed by the robot or set of robots of a station that performs the operation sequence, such as comma separated fields, sections or blocks of a data file, meta data tags, and the like. Stated otherwise, the operation sequence data can be provided 424 in a variety of ways according to needs, expectations, and/or requirements of the system.

Figure 5:
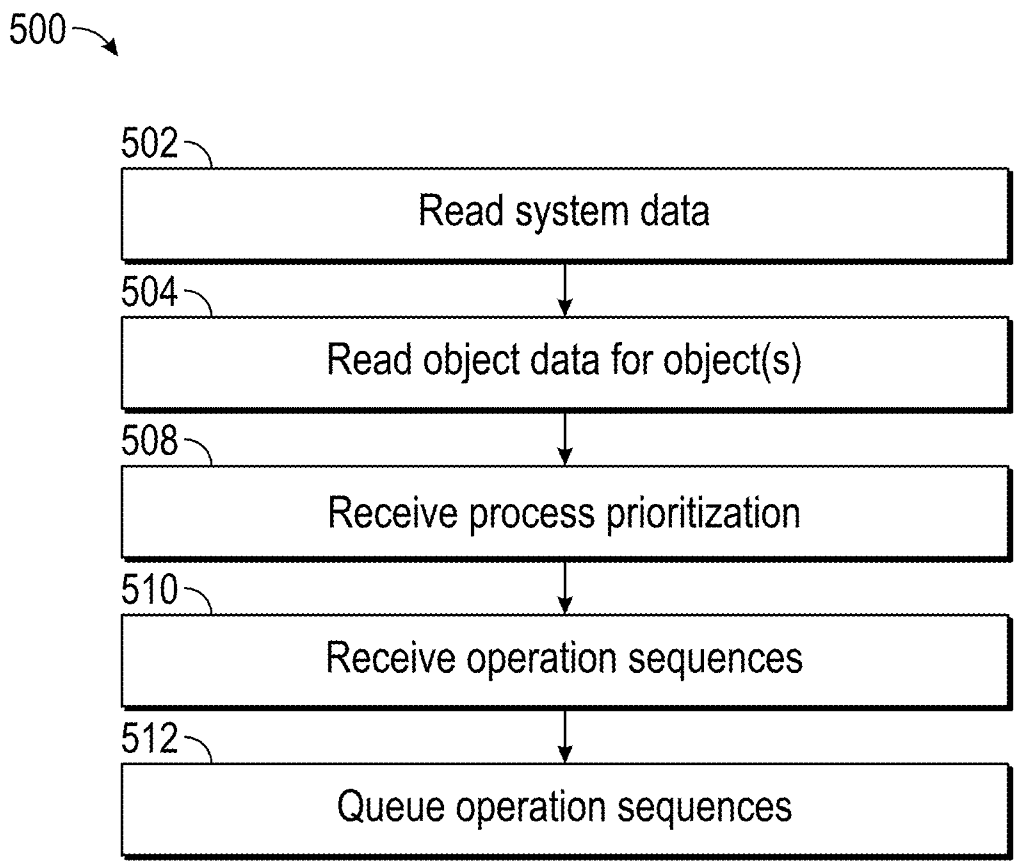
FIG. 5 is a flow diagram of a method of generating an operation schedule, according to one embodiment of the present disclosure.

FIG. 5 is a flow diagram of a method 500 of generating an operation schedule, according to one embodiment of the present disclosure. The resulting operation schedule can specify timing (e.g., relative, actual) of performance of each operation sequence of one or more operation sequences and a set of robots of one or more sets of robots to perform each operation, in order to accomplish one or more physical processes. The method 500 may be executed or otherwise performed by a system to accomplish a physical process (e.g., the system 100 of FIG. 1). The operation schedule can interleave operation sequences of one or more physical processes, such that the system, and more specifically stations of the system, can be concurrently executing multiple operation sequences of a single physical process and potentially of multiple physical processes.

For example, a system to construct a teddy bear may include: a body station (e.g., a body assembly set of robots) that includes a cutting robot, stitching robot, and a filling robot to assemble the body of the teddy bear; an appendages station (e.g., an appendages assembly set of robots) that includes a cutting robot, a stitching robot, and a fill robot to assemble the legs and arms of the teddy bear as well as a stitching robot to attach each appendage to the body of the teddy bear; and a head station (e.g., a head assembly set of robots) that includes a cutting robot, a stitching robot, and a fill robot to assemble the head of the teddy bear as well as a stitching robot to attach the head to the body of the teddy bear. The operation schedule may schedule the head station and the body station to concurrently assemble a head and a body of a first teddy bear. The operation schedule may also schedule the head station and body station to assemble a head and a body of a second teddy bear concurrently with the appendages station assembling appendages of the first teddy bear.

In some embodiments, the operation sequences may be generated so as to be executed by a particular set of robots, and determining an operation schedule may be directed more heavily on timing, whether relative or actual, of each station executing an operation sequence to coordinate with other stations. In other embodiments, operation sequences may be determined in a manner to be agnostic as to which set of robots performs a given operation sequence. In other embodiments, a system to automate or otherwise accomplish a physical process may have multiple sets of robots (e.g., stations) that can perform identical operations. In these scenarios where operation sequences are less tied to a particular station, scheduling can be directed to determining a station of the multiple stations to perform the operation sequence.

As an example, a system to assemble a teddy bear may include multiple appendage assembly stations to assemble appendages of a teddy bear, because there are four appendages that need to be assembled for each body and each head that are assembled. Each appendage assembly station can assemble arms (left or right) and legs (left or right), and the operation schedule can order and/or indicate timing (relative or actual) of each appendage station executing an operation sequence to assemble a given appendage of a teddy bear.

The method 500 can include reading 502 (e.g., obtaining or otherwise receiving) system data, which may include one or more system characteristics specifying one or more of system capabilities and system constraints for a system to accomplish the physical process (or at least a portion of the physical process). The reading 502 system data may be similar to, analogous to, or the same as the reading 402 system data of the method 400 of determining one or more operation sequences of FIG. 4. Stated otherwise, the reading 402 system data of the method 400 of determining one or more operation sequences and the reading 502 system data of the method 500 of generating an operation schedule may be the same action or discrete actions, as appropriate for the system implementing the method(s) and/or a controller thereof. The reading 502 of the system data may include gleaning information that can be used to generate an operation schedule. The information gleaned may be different from, similar to, or in addition to information gleaned from the reading 402 of the system data to determine operation sequences in FIG. 4.

The method 500 may also include reading 506 object data for an object that is a subject of the physical process to be accomplished. Similarly, the reading 506 of object data may be similar to, analogous to, or the same as the reading 406 object data of the method 400 of determining one or more operation sequences of FIG. 4. Stated otherwise, the reading 406 object data of the method 400 of determining one or more operation sequences and the reading 506 object data of the method 500 of generating an operation schedule may be the same action or discrete actions, as appropriate for the system implementing the method(s) and/or a controller thereof. The reading 502 of the object data may include gleaning information that can be used to generate an operation schedule. The information gleaned may be different from, similar to, or in addition to information gleaned from the reading 406 of the object data to determine operation sequences in FIG. 4.

A process prioritization can be received 508 by the method 500. The process prioritization may specify an ordering or prioritization of multiple physical processes to be performed. The multiple physical processes may be of a similar type (e.g., assembling stuffed animals), and the object of each of the physical processes may be different, such that each physical process of the multiple physical processes varies from others of the multiple physical processes. The system implementing the method 500 can be configured to perform various physical processes, and the input received allows for configuring the different executions of those various physical processes. The process prioritization indicates an ordering of objects and/or of physical processes of which those objects are the subject.

In some instances, certain physical processes may be precursors to other physical processes. As a corollary, in some instances, certain physical processes depend on other physical processes. A physical process of assembling an object may understandably need to be done before a physical process of inspecting, packaging, painting, etc. that object. A physical process of mixing an object (e.g., glue or paint) may be a precursor to a physical process of applying that object to another object. In the case of assembling structural components, members (e.g., boards) of the structural component may be the subject of a cutting process before being assembled into the structural component (e.g., a truss). The process prioritization provides input as to which objects or physical processes should be prioritized before others.

For example, a user may provide a process prioritization as a user-ordered production schedule specifying an ordering of producing objects that are the subject of a physical process that produces (e.g., assembles) an object. In the case that the objects are stuffed animals, the process prioritization may be a user-ordered production schedule specifying production of (1) a teddy bear, (2) a giraffe, (3) a hippo, (4) another hippo, and (5) a monkey. The system implementing the method can reference or otherwise utilize the process prioritization or information therein for creating an operation schedule. The process prioritization can be received as manual user input, as a configuration file, or in another appropriate manner to provide the system a prioritization to aspire toward or otherwise prioritize.

Operation sequences are received 510. The operation sequences may be determined by a method of determining operation sequences (e.g., the method 400 of FIG. 4) that may be executed by the same system. The operation sequences may be received from an external source, such as from a user or from a separate computing device (e.g., from a client computing device via a communication network). The operation sequences received 510 may include operations (e.g., individual actions) for each robot of a set of robots to perform in furtherance of performing a physical process.

The received 510 operation sequences are queued 512 for handling (e.g., delivery to and/or execution at a station), based on the read 502 system data, the read 506 object data, and the received 508 process prioritization. The system may maintain a single physical process queue or may maintain one or more queues each corresponding to a station (e.g., set of robots) of the system. The queued 512 operation sequences can, in essence, be an operation schedule specifying timing of performance of each operation sequence of the one or more operation sequences and a set of robots of the one or more sets of robots to perform each operation sequence.

According to one embodiment of the method 500, a system may queue 512 the operation sequences of each physical process sequentially according to the received 508 process prioritization. Stated otherwise, a system may queue 512 at a station (e.g., set of robots) each operation sequence of a highest prioritized physical process before beginning to queue 512 any operation of a lower prioritized physical process. For example, in the case of the aforementioned process prioritization ((1) a teddy bear, (2) a giraffe, (3) a hippo, . . . ), the system would individually queue 512 each operation sequence of the teddy bear process (until all teddy bear operation sequences are queued 512) before beginning to queue 512 any operation sequence of the giraffe physical process.

In another embodiment, the system may queue 512 the operation sequences of each physical process according to a perceived need or demand for performance of such operation sequence. For example, in the case of the aforementioned process prioritization ((1) a teddy bear, (2) a giraffe, (3) a hippo, . . . ), the system may identify appendages as a high demand operation sequence and may seek out appendages operation sequences of the teddy bear physical process, the giraffe physical process, and the hippo physical process at a preference to body operation sequences, such that the giraffe appendages operation sequence(s) may be queued ahead of the teddy bear body operation sequence. Stated otherwise, the appendages may be produced at a rate faster than bodies and so the appendage operation sequence and station(s) may continue without regard for where the other stations are in their operation sequences.

In still another embodiment, the system may queue 512 the operation sequences of each physical process according to a perceived availability of a station (e.g., set of robots) to perform such operation sequence. For example, in the case of the aforementioned process prioritization ((1) a teddy bear, (2) a giraffe, (3) a hippo, . . . ), the system may identify heads as a high throughput operation sequence such that the head station (e.g., set of robots) is likely to have higher availability (e.g., sooner availability) and, accordingly, head operation sequences of the giraffe physical process and the hippo physical process may be queued 512 ahead of some of the teddy bear operation sequences.

In still another embodiment, the system may queue 512 the operation sequences of each physical process according to an interleaving fashion according to feedback, AI and/or machine learning, or other manner of determining efficiency(ies) in performing the physical processes of the process prioritization.

A resulting one or more queues from the queuing 512 of operation sequences can, in essence, be an operation schedule specifying timing of performance of each operation sequence (of the one or more operation sequences) and a station (set of robots of the one or more sets of robots) to perform each operation sequence. The operation schedule (e.g., the queued operation sequences) can be formatted as according to specified in the system data for a given station or otherwise generated into physical process data for transmission or other communication to each station, as previously described. In some embodiments, the operation schedule may be prepared and/or provided according to a data format that may be expected or otherwise needed by the robot or set of robots of a station that performs the operation sequence, such as comma separated fields, sections or blocks of a data file, meta data tags, and the like. Stated otherwise, the operation schedule can be prepared or otherwise provided in a variety of ways according to needs, expectations, and/or requirements of the system.

Figure 6A:
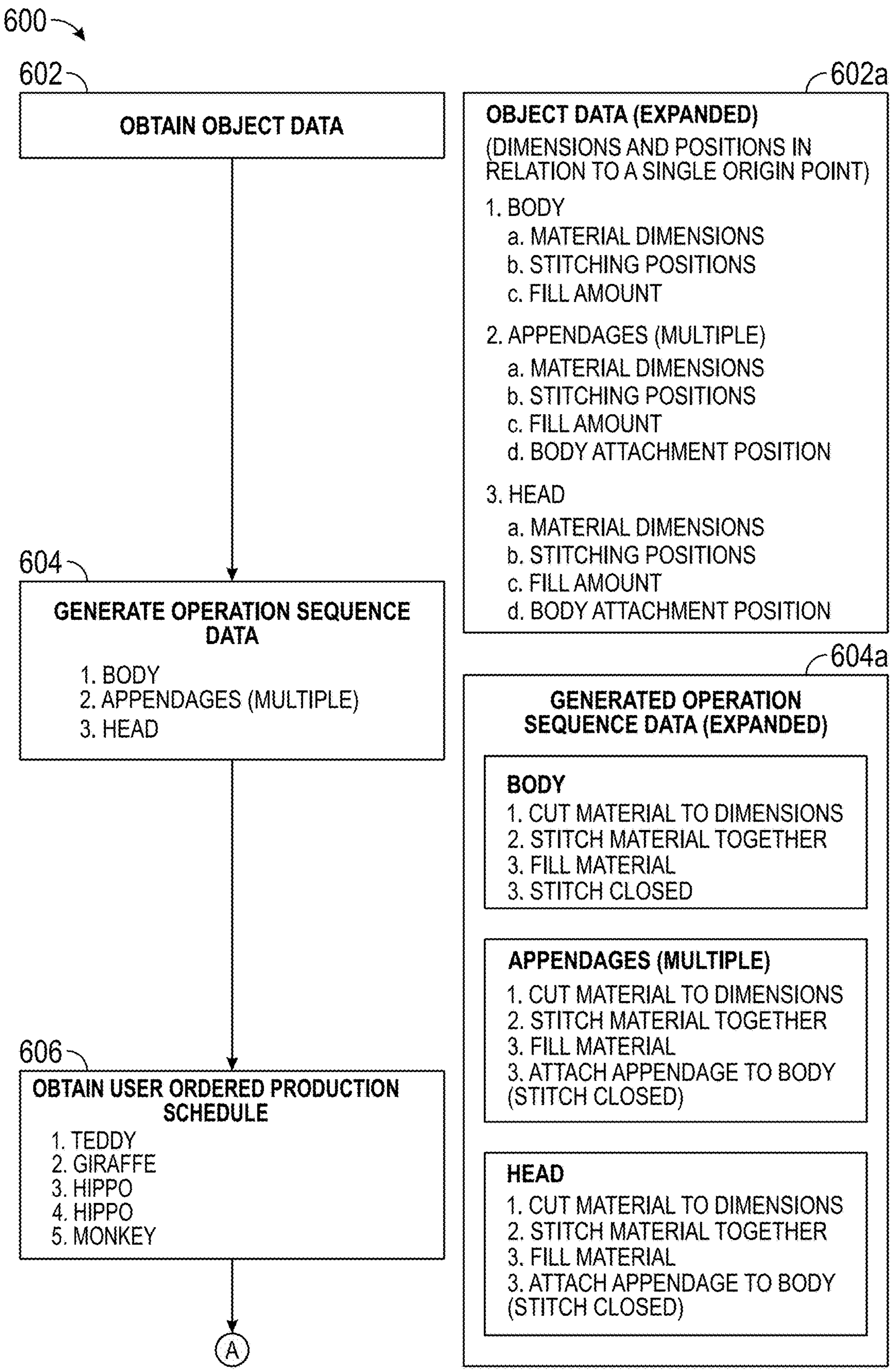
FIGS. 6A and 6B together illustrate a data flow diagram of a method of accomplishing a plurality of physical processes, according to one embodiment of the present disclosure.
Figure 6B:
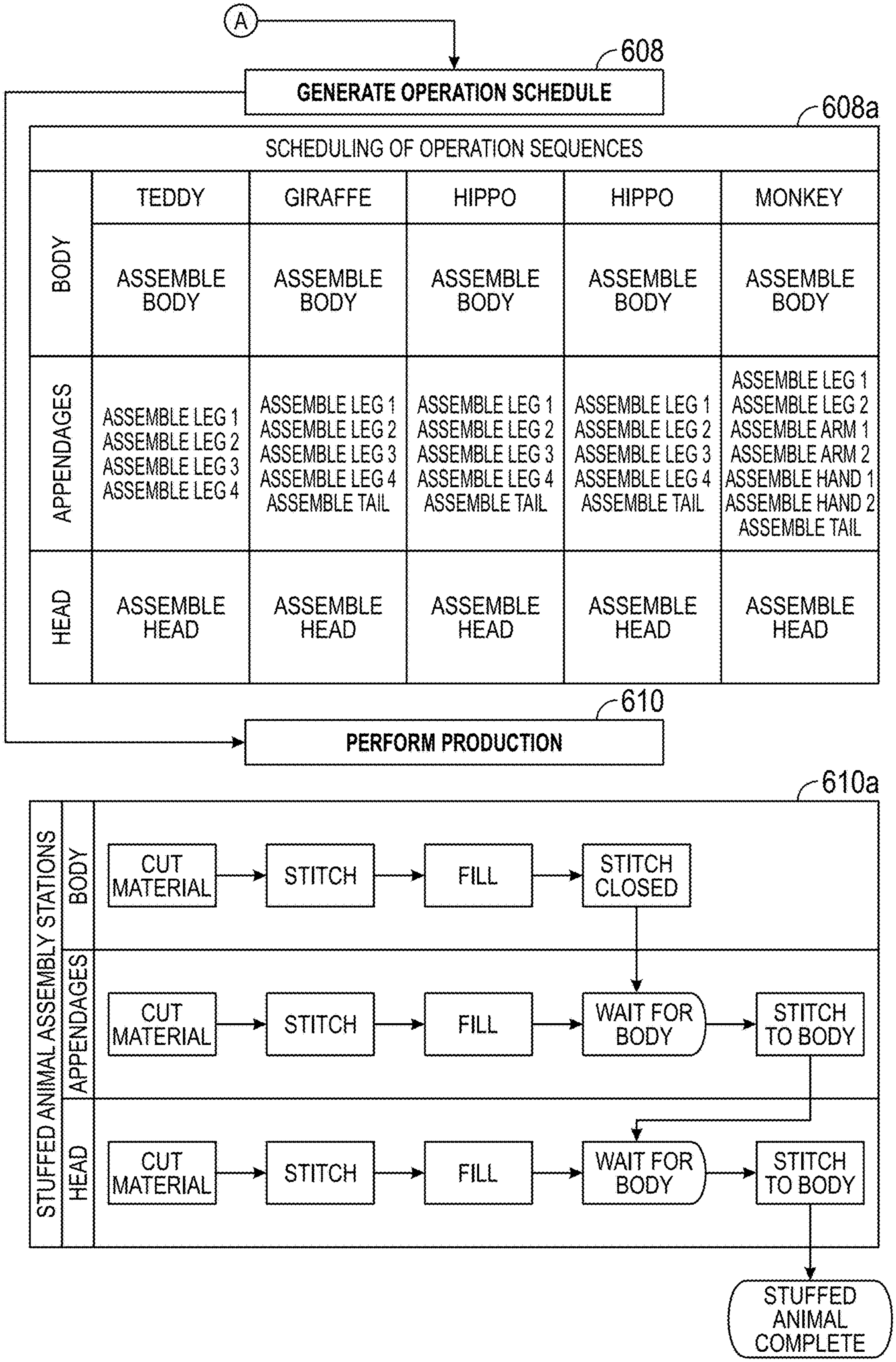

FIG. 6A and FIG. 6B together illustrate a data flow diagram of a method 600 of accomplishing a plurality of physical processes, according to one embodiment of the present disclosure. The method 600 may correspond to (e.g., be performed by) a system for accomplishing physical processes for assembling various stuffed animals (e.g., teddy bears, stuffed giraffes, stuffed hippos, stuffed monkeys, and the like).

The method 600 includes obtaining 602 object data. This object data may be for or of a stuffed animal object that is to be assembled by the system. In FIG. 6A, an example of expanded object data for a teddy bear is illustrated in 602*a*. As illustrated in the expanded object data 602 *a*, this object data may include information about the body of the teddy bear (e.g., material dimensions for one or more pieces of the body, stitching locations for the one or more pieces of the body, and a fill amount (e.g., in cotton fill) for the body). This object data may also include information about (potentially multiple) appendages of the teddy bear (e.g., material dimensions for one or more pieces of each appendage, stitching locations for the one or more pieces of each appendage, a fill amount for each appendage, and/or a body attachment location for each appendage). Further, this object data may also include information about a head of the teddy bear (e.g., material dimensions for one or more pieces of the head, stitching locations for the one or more pieces of the head, a fill amount for the head, and/or a body attachment location for the head).

It is anticipated that, for example, a different stuffed animal may have different object data than what has been illustrated in the expanded object data 602*a* for the example teddy bear. For example, dimensions, stitching positions, fill amounts, body attachment positions, etc. may be different. Further, there may, in some cases of other stuffed animals, be entirely different/additional parts specified in object data for that stuffed animal (e.g., as in a tail in the case of object data for a stuffed monkey).

As discussed herein, each dimension and/or position of the object data may be understood using specified points corresponding to the dimension and/or position of the object in relation to, for example, a single common origin point of or on the stuffed animal (the object).

As discussed herein, it may be that each element of the object data for the stuffed animal is provided directly from an outside source (e.g., a network, a computer readable medium read at the system, etc.).

It will also be understood that in some cases, only some object data of the stuffed animal is provided, and that the system is capable of gleaning additional object data about the stuffed animal. In one example, the material dimensions and the stitching positions of the body may be provided, and a corresponding fill amount for the body could be gleaned at the system using this information. In another example, it may be the case that the system receives (only) information regarding the completed stuffed animal (e.g., dimensions of the completed stuffed animal). In such a case, it may be that the existence of the body, each of the appendages, and/or the head, along with their corresponding sub-data (material dimensions, stitching positions, fill amounts, attachment positions, etc.) as illustrated, could be gleaned at the system.

It will be understood that the presented examples of object data are given by way of example and not by way of limitation. Other possible forms of object data could be obtained as part of obtaining 602 object data. For example, additional aspects of a stuffed animal may be represented in the object data. Of course, in the case of a different system working to assemble or otherwise interact with a different type of object (other than a stuffed animal), it is accordingly anticipated that altogether different types of object data might be expected.

Finally, it should be understood that, as discussed above, the system may be capable of operating in terms of multiple stuffed animal objects simultaneously. Accordingly, it may be that the system obtains 602 object data for a first stuffed animal object while, for example, simultaneously operating any portion of the method 600 relative to a second stuffed animal object (within any applicable constraints).

The method 600 further includes generating 604 (e.g., determining, creating, and/or reading) operation sequence data. Each operation sequence may be configured to accomplish a portion of the physical process of assembling a stuffed animal. For example, as illustrated in the expanded operation sequence data 604*a*, the operation sequence data may include respective operations sequences (each made up of an ordering of a set of physical operations) for assembling a body of the stuffed animal, one or more appendages of the stuffed animal, and/or a head of the stuffed animal. Each such operation sequence may be defined or described in terms of one or more points of the stuffed animal from the object data.

As illustrated, it may be that an operation sequence for assembling the body of the stuffed animal includes physical operations of cutting material to the appropriate dimensions, stitching materials together, filling the (stitched together) material, and stitching the body closed. These physical operations may be determined using, for example, the body portion of the object data for the stuffed animal that was previously described.

Further, it may be than an operation sequence for assembling one (of potentially multiple) appendages for the stuffed animal includes physical operations of cutting material to the appropriate dimensions, stitching materials together, filling the (stitched together) material, and stitching the appendage to the body (which, in the illustrated case, may also act to close a hole in the appendage through which the previous filling action takes place). These physical operations may be determined using, for example, the appendage portion of the object data for the stuffed animal that was previously described. In the event that there is object data for multiple (different) appendages, multiple operations sequences for assembling such appendages (one for each different appendage) could be so generated.

It may also be that an operation sequence for assembling the head of the stuffed animal includes physical operations of cutting material to the appropriate dimensions, stitching materials together, filling the (stitched together) material, and stitching the head closed. These physical operations may be determined using, for example, the head portion of the object data for the stuffed animal that is described herein.

There may, in some cases of other stuffed animals, be entirely different and/or additional operations sequences for that stuffed animal (e.g., as in an operation sequence to assemble a tail in the case of a stuffed monkey).

The operation sequences may be generated 604 or otherwise determined in consideration of system data for one or more a robot, set of robots, and/or area of robots that are available within the system and that represent station(s) at which the operation sequences(s) are to be performed, as described herein. For example, cutting, stitching, and filling operations of the operation sequence for assembling the body of the stuffed animal may be so determined in consideration of the fact that (e.g., because) the system knows that the station at which the head is to be assembled has the appropriate robot(s) for performing these operations (e.g., as determined using the system data, as described herein). Similar types of considerations would apply relative to, for example, operations to be performed by any appendage station and/or body station within the system.

The operations sequences may be generated 604 or otherwise determined in consideration of operation data for the plurality of physical operations that accomplish the physical process of assembling a stuffed animal. As described herein, in some cases, some or all of this operation data is received by the system, and in other cases, some or all of this operation data is derived or extracted from the object data for the stuffed animal. As described, generation 604 of the operation sequences may be an ordering of some or all of the plurality of physical operations.

Each such operation sequence may also be generated 604 or otherwise determined by a process that includes validation of the operation sequence in view of constraints data (e.g., in view of object constraints and/or system constraints), as such validation is described herein.

It will be understood that the presented examples of operation sequences/operation sequence data are given by way of example and not by way of limitation. Other possible forms of operation sequences could be generated as part of generating 604 operation sequence data. It is contemplated that additional/different physical operations relative to a stuffed animal may be included in an operation sequence in some embodiments. For example, an operation sequence for assembling the head of the stuffed animal might further include a physical operation to stitch buttons (representing eyes) to the head. Of course, in the case of a different system working to assemble or otherwise interact with a different type of object (other than a stuffed animal), it is accordingly anticipated that altogether different operation sequences might be expected.

Finally, it should be understood that, as discussed above, the system may be capable of operating in terms of multiple objects simultaneously. Accordingly, it may be that the system generates 604 operation sequence data for a first object while simultaneously operating any portion of the method 600 relative to a second object (within any applicable constraints).

The method 600 further includes obtaining 606 a user-ordered production schedule. For example, the user may use an input device to inform the system of a user desired production schedule. Examples of an input device include (but are not limited to) a personal computer, a smartphone, a tablet, or another type of device.

In the illustrated example, the user may instruct the system to produce a teddy bear, a stuffed giraffe, a first stuffed hippo, a second stuffed hippo, and a stuffed monkey. This instruction may be ordered (such that the system understands that it is to produce and/or prioritize the production of these items in, for example, the order they are received). The system may be capable of obtaining object data for each of these objects and then generating operation sequence data comprising one or more operation sequences for each of these objects, in the manner described herein.

The method 600 further includes generating 608 an operation schedule using the operation sequences for each of the instructed objects. In the illustrated example, the system generates the operation schedule 608*a*. The system determines that, for each physical process (corresponding to an object such as a teddy bear or a stuffed giraffe, etc.), it will use a body station, an appendage station, and a head station to fulfill the user ordered production schedule. This may be done by selecting one or more of each type of station that corresponds to (can perform) a type found among the one or more operation sequences for the objects in the user ordered production schedule. Accordingly, the operation schedule 608*a* specifies the one or more station(s) (e.g., set(s) of robots) that is to perform each of the one or more operation sequences of the operation schedule 608*a*. For example, the operation schedule 608*a* illustrates that a body of the teddy bear is to be assembled by a body station, four appendages of the teddy bear are to be assembled by an appendage station, and the head of the teddy bear is to be assembled by a head station.

The operation schedule 608 may anticipate that that a production prioritization occurs from left to right, across the various objects from the user ordered production schedule. Thus, the system prioritizes the teddy bear, the stuffed giraffe, the first stuffed hippo, the second stuffed hippo, and the stuffed monkey, in that order.

The operation schedule 608*a* may specify the relative timing of its one or more operation sequences. For example, the operation schedule 608*a* may anticipate that operation sequences are performed (e.g., at least begun) in order from top to bottom, down each column of the related operation sequences (as illustrated), and then across the production prioritization order from left to right. Accordingly the operation schedule may first prioritize operation sequences for the body of the teddy bear, operations sequences for the appendages of the teddy bear, and then an operation sequence for the head of the teddy bear (in that order), as illustrated. This timing may be determined by the system according to constraints on the assembly that are determined between the various operation sequences for assembling the teddy bear. For example, the body of the teddy bear is prioritized by the system over the appendages and the head of the teddy bear because the appendages and the head are to be attached to the body as part of their operation sequences (as can be seen in reference to the operation sequence data 604*a*).

The method 600 further includes performing 610 the production relative to the objects. The system generates physical process data that includes the operation schedule for the stuffed animal objects and the one or more operation sequences used in the operation schedule 608*a*. That physical process data is then sent to the one or more stations (e.g., sets of robots) as necessary to cause the production of the stuffed animals.

An assembly method 610*a* illustrating the production for each of the stuffed animals under discussion is provided. The assembly method 610*a* should be understood corresponding to one of the columns of the operation schedule 608*a* (and that it is, for example, repeated for each of the stuffed animals represented by those columns until the entire user ordered production schedule is complete).

The assembly method 610*a* illustrates that robot(s) of the body station perform the body operation sequence (as illustrated in the expanded operation sequence data 604*a*). First, they cut the material for the body, then stitch the material for the body, then fill the body, then stitch the body closed. Then the body is passed to the appendage station.

The assembly method 610*a* illustrates that the robot(s) of the appendage station perform one or more appendage operation sequence(s) (as illustrated in the expanded operation sequence data 604*a*). First, they cut material for an appendage, then stitch the material for the appendage, and then fill the appendage. This process could be repeated by the robots of the appendage station in the event that the appendage station is to create more than one appendage for the given stuffed animal. Then, once the body is received from the body station, the appendage station stitches the appendage(s) to the body. The body is then passed to the head station.

The assembly method 610*a* illustrates that the robot(s) of the head station perform the head operation sequence (as illustrated in the expanded operation sequence data 604*a*). First, they cut material for the head, then stitch the material for the head, and then fill the head. Then, once the body is received from the appendage station, the head station stitches the head to the body. The stuffed animal is then complete.

It should be understood that operations of any station as illustrated in the assembly method 610*a* may be performed while other stations of the system are performing one or more of their operations simultaneously (as to the same or a different object). For example, it may be that each of the body station, the appendage station, and the head station are cutting material as described simultaneously.

FIGS. 6A and 6B illustrate physical processes at a level of assembling a completed stuffed animal. It should be understood that such physical processes can, in some cases, be broken up into sub-physical processes that themselves are made up of one or more operation sequences. For example, a first sub-physical process according to physical process of assembling stuffed animal as described in relation to FIGS. 6A and 6B may include the operation sequences for the assembly of the head and the body of the stuffed animal, and a second sub-physical process (according to the same stuffed animal) may include the operation sequences for the assembly of the appendages of the stuffed animal. It will be understood that each of these sub-physical processes could itself be treated as a (full) physical process. For example, in the event of applying the above-described sub-physical processes as full processes, it may accordingly be that a physical process for the assembly of the head and the body of the stuffed animal may be performed by one or more robot, group(s) of robots, and/or area(s) of robots in a manner that is completely separated from any performance (or non-performance) of a physical process for the assembly of the appendages of the stuffed animal (by either the same robot, group(s) of robots, and/or area(s) of robots, or by a different robot, group(s) of robots, and/or area(s) of robots).

FIG. 7 illustrates a snapshot 702 of the progress of multiple operation schedules (e.g., the operation schedules 608*a* of FIG. 6B) at a single point in time. As discussed above, it is contemplated that the system may act to process or perform physical operations of multiple operation sequences simultaneously.

In some cases, this may occur across different objects. For example, as illustrated in the snapshot 702, the body station of the system may include first robot(s) that are presently filling the body of a first stuffed hippo (a first object), include second robot(s) that are stitching material for a second stuffed hippo (a second object), and include third robot(s) that are cutting material for a stuffed monkey (a third object). Other examples could be drawn from the snapshot 702.

In other cases, this may occur across a same object. For example, as illustrated in the snapshot 702, the appendage station may include first robots that are stitching material for a first appendage (Leg 1) the first hippo (a first object) and may further include second robot(s) that are cutting material for a second appendage (Leg 2) of that same hippo. Other examples could be drawn from the snapshot 702.

The snapshot 702 also illustrates generally the production prioritization (e.g., in the left-to-right order of the teddy bear, the stuffed giraffe, the first stuffed hippo, the second stuffed hippo, and the stuffed monkey, in that order, as described in relation to FIG. 6B). For example, as can be seen, the leftmost object (the teddy bear) is nearly complete (and will be once the head is attached), while the rightmost object (the stuffed monkey) has just begun having materials for the body being cut (with many operation sequences still queued (and the stations having not even begun performing the operations of those queued operation sequences)).

Finally, the snapshot 702 also illustrates generally the timings for the operation sequences found in the columns (e.g., in the top-to-bottom order of the body operation sequence, the appendage(s) operation sequence(s), and the head operation sequence, in that order, as described in relation to FIG. 6B). For example, as can be seen, the body of the stuffed giraffe is complete and most of the appendages are attached, while a remaining appendage (the tail) and the head have not yet completed their corresponding operation sequences.

Figure 8:
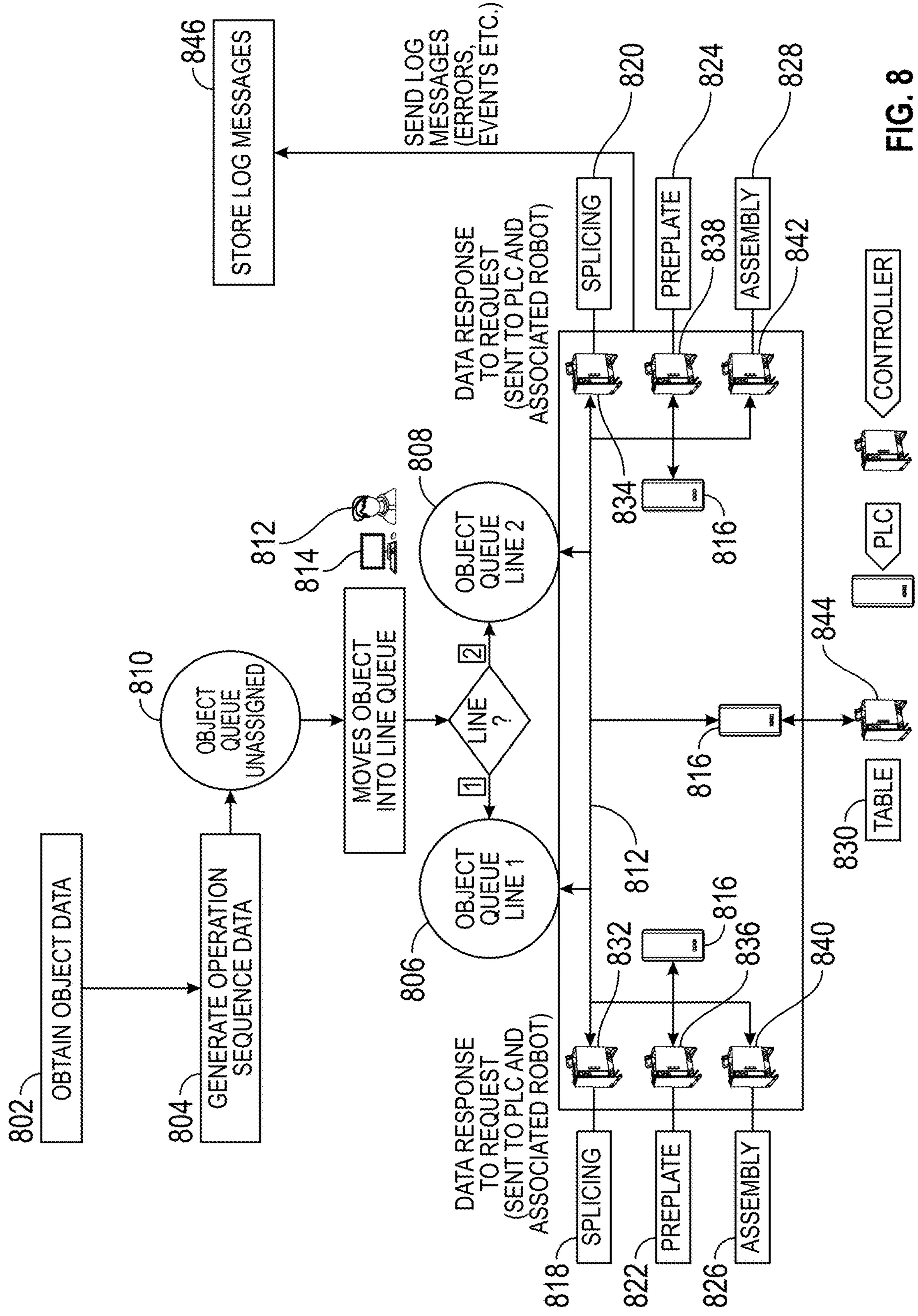
FIG. 8 is a data flow diagram of a method of accomplishing a physical process, according to one embodiment of the present disclosure.

FIG. 8 is a data flow diagram of a method 800 of accomplishing a physical process, according to one embodiment of the present disclosure. The method 800 may correspond to (e.g., be performed by) a system for accomplishing physical processes for assembling a structure. In the description of the method 800, an example of a structure that is a truss will be used. However, it should be understood that the system that is illustrated in FIG. 8 as corresponding to the method 800 as described could be used to assemble some other structure that is, for example, used in the construction of a building, such as a wall, or some other structure.

The method 800 includes obtaining 802 object data. This object data may be for or of, for example, a truss that is to be assembled by the system. Object data for a truss may include an identification of individual members of the truss, the dimensions (length, width, and/or height) of each member, information regarding the placement (location and/or orientation) of each member of the truss relative to other members, an identification of platings used in the truss, the dimensions (length, width, and/or height) of each plating, the placement of the plating (e.g., which member(s) receive the plating and at which point(s) on the surfaces of those member(s), the orientation of the plating relative to these member(s)), etc.

It is accordingly contemplated that object data for different trusses would accordingly include different such data. Each dimension and/or position of the object data may, in some cases, be understood by using specified points corresponding to the dimension and/or position of the truss in relation to a single common origin point for the truss (the object).

It may be that each element of the object data for the truss is provided directly from an outside source (e.g., a network, a computer readable medium read at the system, etc.).

It will also be understood that, in some embodiments, only some object data of the truss is provided, and that the system is capable of gleaning additional object data about the truss. In one example, the dimensions, orientations, and relative placements of two adjacent members in the truss could be given, and corresponding plate(s) to use to connect these two members within the truss could be gleaned by the system.

It should be understood that, as discussed above, the system may be capable of operating in terms of multiple truss objects simultaneously. Accordingly, it may be that the system obtains 802 object data for a first truss object while simultaneously operating any portion of the method 800 relative to a second truss object (within any applicable constraints).

The method 800 further includes determining 804 (e.g., generating, creating, and/or reading) operation sequence data. Each operation sequence may be configured to accomplish a portion of the physical process of assembling a truss. For example, the operation sequence data may include respective operation sequences (each made up of an ordering of a set of physical operations) for splicing members of a truss, plating those members, and assembling those plated members into the completed truss. Each such operation sequence may be defined or described in terms of one or more points of the truss from the object data.

It may be that an operation sequence for splicing members of the truss may include operations for lumber infeed, operations for shaping or cutting the members, and/or operations for member outfeed (e.g., after cutting or shaping). These operations may be determined using the object data for the truss.

An operation sequence for plating the members may include operations for member infeed, operations for plating the members, and operations for member outfeed (e.g., after plating). These operations may be determined using the object data for the truss.

An operation sequence for assembling the members into a completed truss may include operations for member placement on an assembly table, operations for member positioning on the assembly table, operations for plating, operations for pressing, and/or operations for truss outfeed. These operations may be determined using the object data for the truss.

The operation sequences may be determined 804 in consideration of system data for one or more a robot, set of robots, and/or area of robots that are available within the system and that represent station(s) at which the operation sequences(s) are to be performed, as described herein. For example, infeed, cutting, and outfeed operations of the operation sequence for splicing members of the truss may be so determined in consideration of the fact that (e.g., because) the system knows that the station at which the splicing of the members is to occur has the appropriate robot(s) for performing these operations (e.g., as determined using the system data, as described herein). Similar types of considerations would apply relative to, for example, operations to be performed by any plating station and/or assembly station within the system.

The operation sequences may be determined 804 in consideration of operation data for the plurality of physical operations that accomplish the physical process of assembling a completed truss. As described herein, in some cases, some or all of this operation data is received by the system, and in other cases, some or all of this operation data is derived or extracted from the object data for the truss. Each of the operation sequences may be an ordering of some or all of the plurality of physical operations.

Each such operation sequence may also be determined 804 by a process that includes validation of the operation sequence in view of constraints data (e.g., in view of object constraints and/or system constraints), as such validation is described herein.

Further, it should be understood that, as discussed above, the system may be capable of operating in terms of multiple objects simultaneously. Accordingly, it may be that the system determines 804 operation sequence data for a first object while simultaneously operating any portion of the method 800 relative to a second object (within any applicable constraints).

The illustrated system may include multiple object queue lines for arranging for the production of one or more trusses. For example, in FIG. 8, a first object queue line 806 and a second object queue line 808 may be available. These object queue lines may provide a level of organization as between multiple groups of stations. For example, an object queue line may be uniquely assigned to, or may prefer, certain stations within the system over others (even in the case where those stations have similar or same capabilities). This arrangement may help human users to organize stations according to preference and/or respective to relative station physical placement. It is noted that there is no requirement for any particular association or particular linking of any particular station of the system to any particular object queue line, but that such associations may be made as an option for cases where human operators find it conceptually and/or physically convenient.

A third object queue line may also be available. The third object queue line may, in some embodiments, be determined to include components of other queue lines. For example, the third object queue line may include the splicing 818, the preplate station 824, and the assembly station 826. A third object queue line may be determined to include any compatible components, regardless of whether such are already included in an existing queue line.

After the operation sequence data for a particular truss is determined 804, it may be that the truss can be assigned 810 be produced according to one of these object lines. A user 812 may use an input device 814 to move 816 an instance of the object into one of the first line queue 806 and the second line queue 808 (which may or may not have other assigned instances of the same or a different object in that queue).

Each of the first line queue 806 and the second line queue 808 represents a queue of objects that are scheduled to be produced in the order that they are present. In such circumstances, it may accordingly be understood that each of the first line queue 806 and the second line queue 808 represent user ordered production schedules for the objects (e.g., trusses) found in that queue. Note that while two object queue lines 806 and 808 have been illustrated in FIG. 8, it is anticipated that any number (one, three, more) of object queue lines could be used in other embodiments.

An operation schedule specifying timing of performance of the operation sequences represented in the generated operation sequence data is also generated. In examples using multiple object line queues, it may be understood that a single operation schedule corresponding to the objects of both queues is generated. Alternatively, unique operation schedules corresponding to the objects in a single object line queue are generated.

For each of the operation sequences within an operation schedule, the system determines a timing of performance of each operation sequence. This timing may be determined relative to other operation sequences. For example, when operating with the operation sequences from the operation schedule relative to a same truss, it may be that the operation sequence for splicing the members of the truss begins prior to the operation sequence for plating the members of the truss, which begins prior to the operation sequence for assembling the completed truss. This timing may reflect the natural ordering of member processing through the system for that particular truss object.

The operation schedule also specifies one or more station(s) (e.g., sets of robots) that is to perform each of the one or more operation sequences of the operation schedule. The example of FIG. 8 includes the first splicing station 818 and the second splicing station 820, the first plating station 822 and the second plating station 824, and the first assembly station 826 and the second assembly station 828 (which operate with the table 830). The example of FIG. 8 may also include a cutting station or other member shaping station (not shown) for cutting members for supplying to the splicing stations 818, 820 and/or to the preplate stations 822, 824. The operation schedule may specify that one or both of the first splicing station 818 and the second splicing station 820 perform the operation sequence for a particular one of one or more truss(es) represented in the operation schedule. The operation schedule may also specify that one or both of the first plating station 822 and the second plating station 824 perform the operation sequence for plating the members of that truss. The operation schedule may also specify that one or both of the first assembly station 826 and the second assembly station 828 perform the operation sequence for assembling that truss on the table 830 (in conjunction with any table-specific operations, such as pressing, that finalize the completed truss). Note for simplicity of explanation here, the table 830 may be considered part of the first assembly station 826 and/or the second assembly station 828 when operating/being operated in conjunction with those station(s)

The system generates physical process data that includes an operation schedule and the one or more operation sequences used in that operation schedule. This physical process data is sent to the one or more stations 818-830 (e.g., sets of robots). For example, the physical process data may be sent for processing by one or more PLCs 816 of the one or more stations 818-830, which may in turn instruct one or more of the controllers 832-844 of one or more respective stations 818-830 to operate the station to perform some or all of a related operation sequence.

The PLCs 816 may, according to the physical process data, instruct one or more of the first splicing station controller 832 for the first splicing station 818 and the second splicing station controller 834 for the second splicing station 820 to cause their respective splicing station(s) to perform some or all of an operation sequence for splicing truss members. The PLCs may also ensure that information regarding the splicing station(s) so instructed to perform the operation sequence for splicing, and the timing for performing this operation sequence at those splicing station(s), are maintained according to the operation schedule data found in the physical process data.

The PLCs 816 may, according to the physical process data, instruct one or more of the first plating station controller 836 for the first plating station 822 and the second plating station controller 838 for the second plating station 824 to cause their respective plating station(s) to perform some or all of an operation sequence for plating truss members. The PLCs may also ensure that information regarding the plating station(s) so instructed to perform the operation sequence for plating, and the timing for performing this operation sequence at those plating station(s), are maintained according to the operation schedule data found in the physical process data.

The PLCs 816 may, according to the physical process data, instruct one or more of the first assembly station controller 840 for the first assembly station 826, the second assembly station controller 842 for the second assembly station 828, and the table controller 844 for the table 830 to cause their respective assembly station(s) (e.g., conceptually including the table) to perform some or all of an operation sequence for assembling truss members. The PLCs may also ensure that information regarding the assembly station(s) so instructed to perform the operation sequence for assembly, and the timing for performing this operation sequence at those assembly station(s), are maintained according to the operation schedule data found in the physical process data.

The operation sequences are then executed at their respective stations and according to the operation schedule in order to assemble the one or more trusses called for in the physical process data. For example, one or more splicing station(s) 818, 820 may splice members of a truss which are then fed into one or more plating station(s) 822, 824. The one or more plating station(s) 822, 824 may then plate or pre-plate the members, which are then fed into one or more assembly station(s)s 826, 828. The one or more assembly stations 826, 828 may then place and/or position the (plated or pre-plated) members on the table 830, perform any additional plating of the members, and perform table operations such a pressing to finalize the assembly of the truss.

The system may also store 846 log messages related to the assembly of one or more trusses by the system. For example, these log messages may include whether an assembly of a truss succeeded or failed, a timestamp for the assembly of the truss, etc.

The foregoing discussion of FIG. 8 describes physical processes at a level of assembling a structure that is a truss. It should be understood that this physical process may, in some cases, be understood to be a sub-physical process that is part of a larger overarching physical process. For example, the physical process for assembling a truss (e.g., as has been described in relation to FIG. 8) may be, when considered at another level, a sub-physical process for an overarching physical process (e.g., for assembling a room). Then, it may be that a second sub-physical process for the overall physical process of assembling a room may be for assembling a wall. It will be understood that each sub-physical processes for assembling the room could itself be treated as a (full) physical process in such cases. Accordingly, it may be that the sub-physical process for assembling the truss may be performed by one or more robot, group(s) of robots, and/or area(s) of robots in a manner that is completely separated from any performance (or non-performance) of another sub-physical process for the assembly of the wall (by either the same robot, group(s) of robots, and/or area(s) of robots, or by a different robot, group(s) of robots, and/or area(s) of robots).

Figure 9:
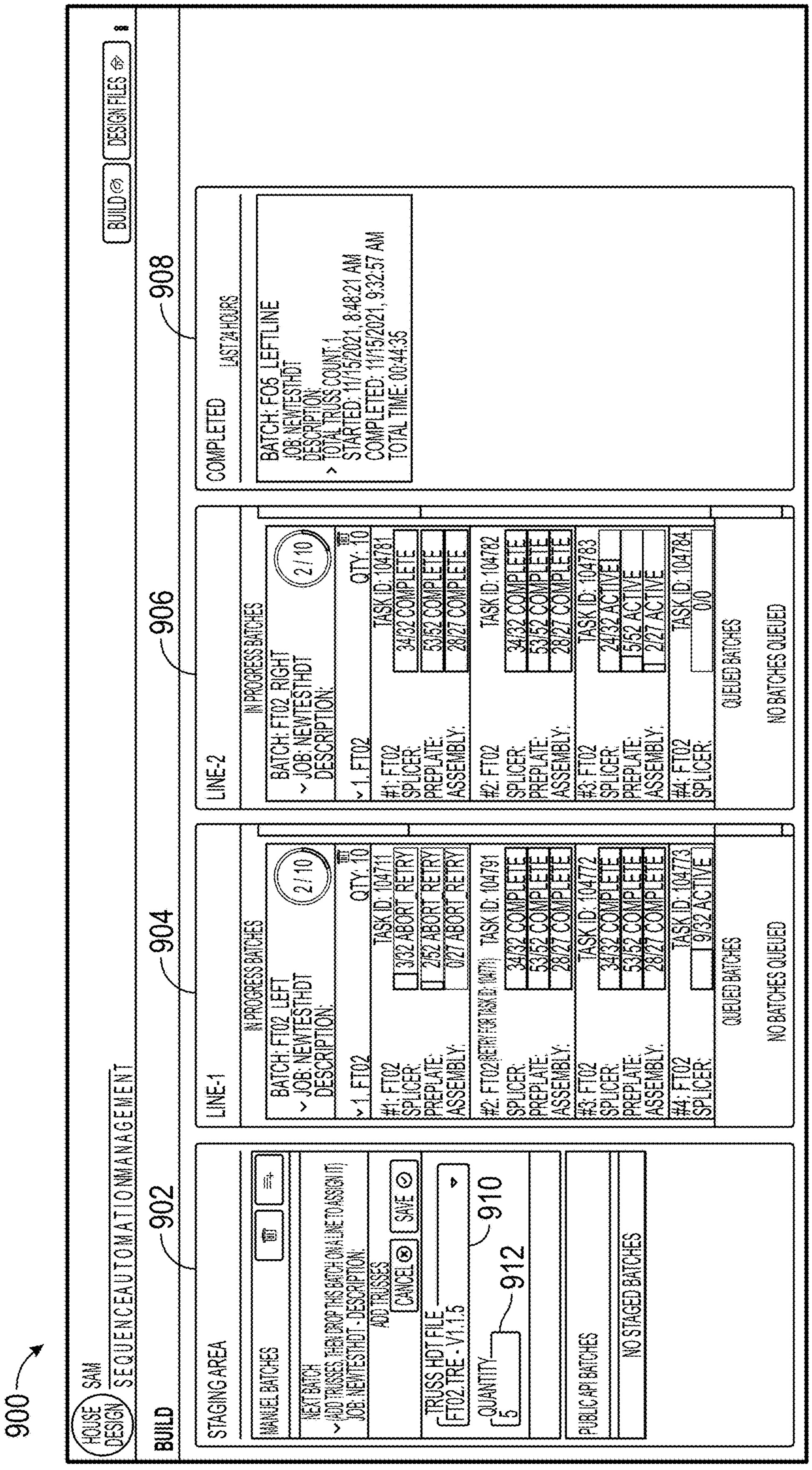
FIG. 9 illustrates a graphical user interface (GUI) of an input device that is used to generate a user ordered production schedule by moving one or more instances of an object into one of a first line queue and a second line queue.

FIG. 9 illustrates a GUI 900 of an input device that is used to generate a user ordered production schedule by moving one or more instances of an object into one of a first line queue 904 and a second line queue 908. The GUI 900 may be a GUI that is displayed by, for example, the input device 814 of FIG. 8.

The GUI 900 illustrates a staging area 902. In this staging area, the user may select a file 910 having the object data for a truss that is to be assembled. The system may then generate the operation sequences based on that object data for the truss, as described above.

An instance of the object represented by the object data of the file 910 may then be assigned to one of the first line queue 904 of the second line queue 906. This may be performed by interfacing with the GUI 900 in some fashion (e.g., dragging and dropping the staging area 902 as configured onto one of the first line queue 904 or the second line queue 906 as desired, though other mechanisms are contemplated).

As illustrated, in some embodiments, the user may also instruct a quantity 912 of object instances in the staging area 902 to call for a "batch" of that object to be made by the system, with such "batching" causing repetitions of the same object instance be placed to the same line queue at the same time. Such batching is not strictly required in all embodiments, but may speed the process of populating the user ordered production schedule into a line queue 904, 906.

The first line queue 904 illustrates the current progress of a first user ordered production that is currently in progress through the system. As shown, the first user ordered production has called for four instances of the truss corresponding to the identifier FT02 (an "FT02 truss"). Note that while this is illustrated in this embodiment as having been assigned as part of a single batch, this is not required. Further, while the same FT02 truss has been illustrated as called for four times in the first user ordered production, this is only by way of example (the user is free to alternatively queue a mix of different objects into the first user ordered production).

As illustrated, each of these FT02 truss instances is associated with an operation sequence for splicing the members of an FT02 truss, an operation sequence for pre-plating an FT02 truss, and an operation sequence for assembling an FT02 truss. Further, the first line queue 904 graphically illustrates the progress of each of these operation sequences for each instance of the four FT02 trusses. For example, the first instance illustrates that the operation sequence for splicing according to this instance was aborted on the third step of that sequence, that the operation sequence for the plating according to this instance was aborted on the second step, and that the operation sequence for assembly according to this instance was never begun. The first line queue 904 further graphically illustrates that the operation sequences for each of splicing, pre-plating, and assembly were successfully completed for each of the second and third instances of the FT02 truss, and that (at least) the operation sequence for splicing according to the fourth instance of the FT02 truss is currently in progress (and is on the ninth step of that process).

The second line queue 906 illustrates the current progress of a second user ordered production that is currently in progress through the system. As shown, the second user ordered production has called for four instances of the truss corresponding to the identifier FT02 (an "FT02 truss"). Note that while this is illustrated in this embodiment as having been assigned as part of a single batch, this is not required. Further, while the same FT02 truss has been illustrated as called for four times in the second user ordered production, this is only by way of example (the user is free to alternatively queue a mix of different objects into the first user ordered production). Note also that the fact that the second user ordered production calls for the same FT02 truss called for as part of the first user ordered production of the first line queue 904 is a possible example, but is not required (the second line queue 906 could call for entirely different object(s) from the first line queue 904 instead).

As illustrated, each of the FT02 truss instances is associated with an operation sequence for splicing the members of an FT02 truss, an operation sequence for pre-plating an FT02 truss, and an operation sequence for assembling an FT02 truss. Further, the second line queue 906 graphically illustrates the progress of each of these operation sequences for each instance of the four FT02 trusses. For example, second line queue 906 graphically illustrates that the operation sequences for each of splicing, pre-plating, and assembly were successfully completed for each of the first and second instances of the FT02 truss. Further, as shown, and the operation sequence for splicing according to the third instance of the FT02 truss is currently in progress (and is on the 24th step of that process), the operation sequence for pre-plating according to the third instance of the FT02 truss is currently in progress (and is on the fifth step of that process), and the operation sequence for assembly according to the third instance of the FT02 truss is currently in progress (and is on the second step of that process). Finally, as can be seen, the fourth instance of the FT02 truss has not yet begun (assuming that the illustrated splicing operation sequence is timed prior to any further unillustrated operation sequences for that fourth instance of the FT02 truss).

The GUI 900 further includes a log area 908 that logs, e.g., completed trusses. As illustrated, the log can be arranged according to batches (but this is not required, as individual trusses may also be logged here). These log messages may include information regarding whether an assembly of a truss succeeded or failed, a timestamp for a truss (and/or a batch of trusses), the time it took to assemble the truss/batch of trusses, identifiers for the "job" or "task" for assembling the truss/batch of trusses, etc. This log information may be stored for later retrieval (e.g., in addition to being displayed on the GUI 900 as shown here).

Figure 10:
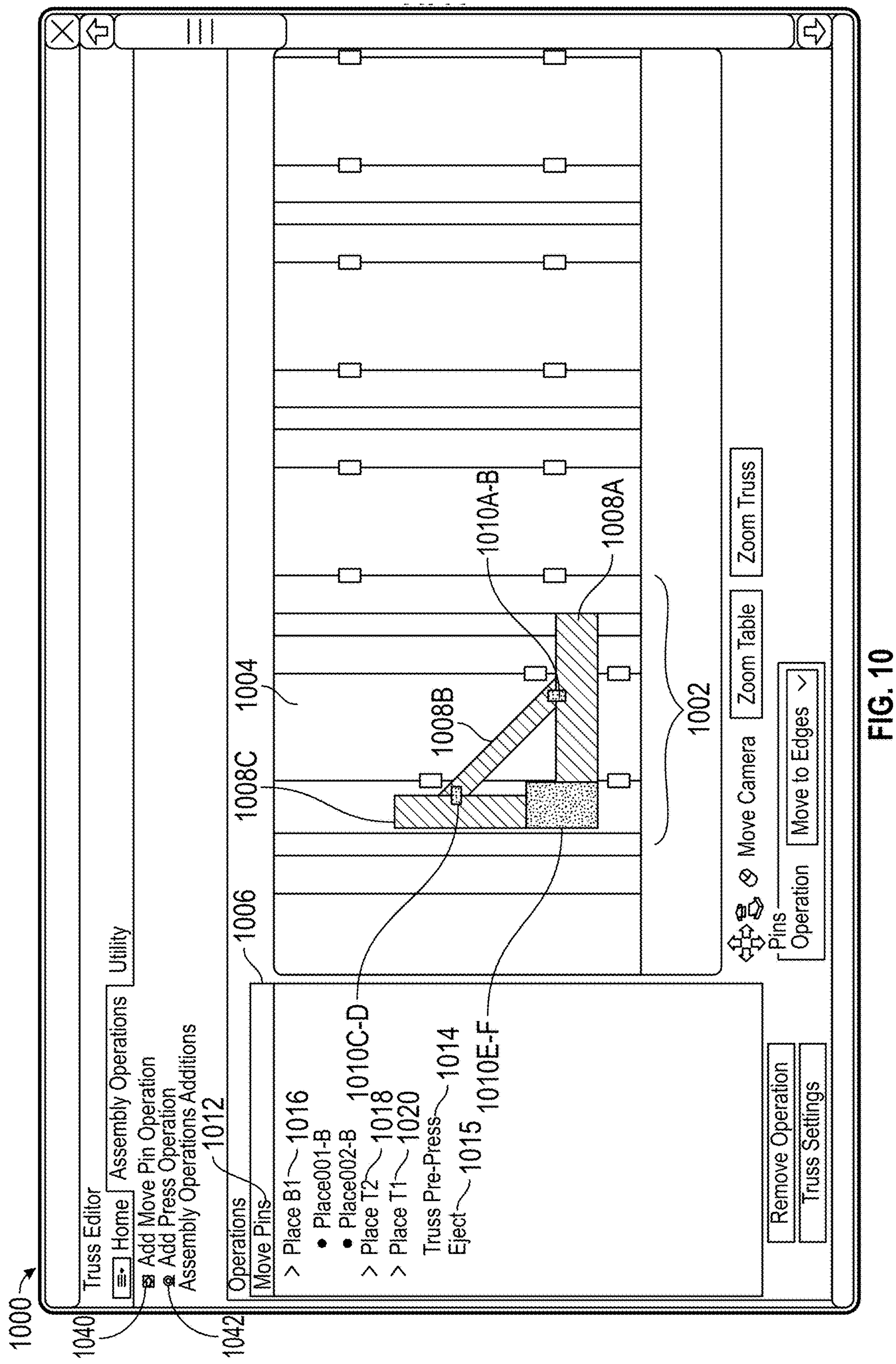
FIG. 10 is an illustration of a GUI showing a component outline of a truss, a graphical depiction of an assembly table, and a sequence window, according to an embodiment.

FIG. 10 is an illustration of a GUI 1000 showing a component outline 1002 of a truss (e.g., as an example of a structural component (object) to be assembled), a graphical depiction of an assembly table 1004, and a sequence window 1006, according to an embodiment. The GUI 1000 may correspond to one or more assembly station(s) of a system for assembling structural components, as described above. This GUI 1000 may be displayed to a user on a display and may be configured to accept input from the user.

The component outline 1002 may be based on a previously created data model of a truss generated from object data. The component outline 1002 may indicate the member locations 1008A-1008C of the truss. The component outline 1002 may also indicate the fastener locations 1010A-1010F of the structural component.

The GUI 1000 further includes an operation sequence window 1006 illustrating an operation sequence of actions or operations to be performed by the assembly station(s). This operation sequence may comprise an operation sequence for assembling the truss at an assembly table of an assembly station of the system. In other words, the GUI 1000 may assume that other stations of the assembly system (e.g., splicing station(s), plating station(s)) will operate to ultimately provide the components needed to perform the operation sequence for assembly illustrated in the operation sequence window 1006.

Some operations (e.g., the "Move Pins" operation 1012) may be preparatory operations for preparing the assembly table 1004 for the receipt of placed members. Other operations (e.g., the "Truss Pre-Press" operation 1014 or the "Eject" operation 1015) may be finishing operations, such as for finalizing any potential fastenings that exist between members and fasteners that have been placed into their appropriate assembly positions and/or for removing a completed structural component from the assembly table 1004. Finally, some operations (such as the placement operations 1016-1020) may be operations that cause, for example, a board (e.g., that was spliced at a splicing station, and along with any fasteners subsequently attached during pre-plating at a plating station) to be placed on the assembly table or other assembly surface (e.g., through the operation of a robotic arm of an assembly station). These placement operations 1016-1020 may each be associated with one of the member locations 1008A-1008C.

In some embodiments, it may be that a user may use the GUI 1000 to re-order the physical operations listed in the operation sequence window 1000. This may be done by, e.g., using a user input device (such as a mouse and/or keyboard) to receive user input and re-order the assembly operations accordingly. It is further contemplated that a user may use a GUI 1000 to add operations to the operations listed in the operation sequence window 1006. This may be done by, for example, using the add move pin operation button 1040 and/or the add press operation button 1042. The addition of other types of assembly operations (e.g., placement operations) is also contemplated. Note that this manual establishment/ordering is given by way of example and not by way of requirement, as it is anticipated that in many embodiments the operation sequence for assembly will be generated (automatically) by the system as described above, and may not need further adjustment.

In cases where the physical operations listed in the operation sequence window are re-ordered, the system may back-propagate the effects of such change through any prior operation sequences on which the illustrated operation sequence depends. For example, if the placement operations 1016-1020 are re-ordered by the user, the system may change an ordering of physical operations within a corresponding operation sequence for splicing and/or operation sequence for plating as necessary, such that the assembly station receives the members for the placement operations in the new order (and as configured with plating that "fits" (works with) the new order of placement operations).

The GUI 1000 is given by way of example. It will be understood that other GUIs could be provided corresponding to other stations of the system (e.g., corresponding to a splicing station and/or a plating station) relative to the truss to be assembled. These other GUI could similarly display and optionally allow user changes to an illustrated operation sequence performed by that corresponding station.

It will also be understood that other GUIs could be provided corresponding to stations in altogether different systems. For example, a body station of a system for creating stuffed animals may illustrate (and/or enable a user to make changes to) an operation sequence including cutting, stitching, and filling actions of the body station, as described above.

EXAMPLES

Some examples of embodiments of the present disclosure are provided below.

Example 1. A system to accomplish (e.g., automate) a physical process comprising: one or more sets of robots (e.g., devices/stations), each robot to receive instruction to perform one or more physical operations; a controller (e.g., a computing device) in communication with each of the one or more sets of robots, the controller comprising: a communication interface; one or more processors to: receive object data for an object (e.g., a physical structure) that is a subject of a physical process (to be accomplished), the object data specifying points of the object; determine (including generate and/or modify) one or more operation sequences each to accomplish a portion of the physical process, each operation sequence of the one or more operation sequences providing an ordering of a set of physical operations that are associated with the one or more points of the object and that are to be performed by a set of robots of the one or more sets of robots; generate an operation schedule specifying timing of performance of each operation sequence (of the one or more operation sequences) and a set of robots of the one or more sets of robots to perform each operation sequence; generate physical process data comprising the operation schedule and the one or more operation sequences; and communicate (e.g., distribute) the physical process data, via the communication interface, to the one more sets of robots to perform the one or more operation sequences according to the operation schedule to accomplish the physical process.

Example 2. The system of Example 1, wherein the one or more processors are further to receive system data, including system characteristics specifying one or more of system capabilities and system constraints for each robot in each set of the one or more sets of robots.

Example 3. The system of Example 1, wherein the one or more processors are further to receive constraints data specifying one or more of: object constraints, including requirements pertaining to the physical process in relation to the object; and system constraints, including one or more of system capabilities and system limitations for one or more robots in each set of robots of the one or more sets of robots, wherein the one or more processors determine the one or more operation sequences based on the constraints data, and wherein the one or more processors generate the operation schedule based on the constraints data.

Example 4. The system of Example 1, wherein the one or more processors determine the one or more operation sequences by extracting, from the object data, operation data for a plurality of physical operations to be performed by one or more robots to accomplish the physical process, wherein the set of physical operations for which an ordering is provided by an operation sequence are from the plurality of physical operations.

Example 5. The system of Example 1, wherein the one or more processors are further to receive operation data for a plurality of physical operations to be performed by the one or more sets of robots to accomplish the physical process, wherein the set of physical operations for which an ordering is provided by an operation sequence are from the plurality of physical operations.

Example 6. The system of Example 5, wherein the one or more processors are further to associate each of the one or more points of the object with one or more physical operations of the set of physical operations based on the object data and the operation data.

Example 7. The system of Example 1, wherein the object data indicates an arrangement (e.g., or organization) of constituent parts of the object.

Example 8. The system of Example 1, wherein the physical process is to construct or otherwise assemble the object that is the subject of the physical process.

Example 9. The system of Example 1, wherein the physical process is to deconstruct (or disassemble) the object that is the subject of the physical process.

Example 10. The system of Example 1, wherein the physical process is to inspect the object that is the subject of the physical process.

Example 11. The system of Example 1, wherein the physical process is to move the object that is the subject of the physical process.

Example 12. The system of Example 1, wherein the physical process is to integrate (e.g., mix, couple) constituent components of the object that is the subject of the physical process.

Example 13. The system of Example 1, wherein the physical process is to apply another element to the object.

Example 13.1. The system of Example 1, wherein the object data comprises spatial position data to specify the points of the object.

Example 13.2. The system of Example 13.1, wherein the spatial position data comprises (e.g., three-dimensional (3D)) coordinates.

Example 14. The system of Example 1, wherein the object data comprises constituent part data and interconnection data to indicate one or more interconnections (e.g., intersection, connection, interrelation) between two or more constituent parts.

Example 15. The system of Example 1, wherein one or more of the plurality of physical operations is a sub-physical process comprising a plurality of physical operations.

Example 16. The system of Example 1, wherein the timing of performance of a first of the one or more operation sequences is relative to a second of the one or more operation sequences.

Example 17. A computer-implemented method (e.g., of a computing system) to coordinate performance of one or more physical operations by one or more sets of robots to accomplish a physical process, comprising: receiving (e.g., at a computing system) object data for an object (e.g., a physical structure) that is a subject of the physical process (to be accomplished), the object data specifying points of the object; determining (e.g., by one or more processors; e.g., one of generating and/or modifying) one or more operation sequences each to accomplish a portion of the physical process, each operation sequence providing an ordering of a set of physical operations associated with the one or more points of the object; generating (e.g., by the one or more processors) an operation schedule specifying timing of performance of each operation sequence (e.g., of the one or more operation sequences) and a set of the one or more sets of robots to perform each operation sequence; generating (e.g., by one or more processors) physical process data comprising the operation schedule and the one or more operation sequences; and communicating (e.g., distributing), e.g., via a communication network, the physical process data to the one or more sets of robots to perform the one or more operation sequences according to the operation schedule to accomplish the physical process.

Example 18. The method of Example 17, further comprising using the one or more sets of robots to perform the one or more operation sequences according to the operation schedule to accomplish the physical process.

Example 19. The method of Example 17, further comprising obtaining system characteristics specifying one or more of system capabilities and system constraints for each robot in each set of robots of the one or more sets of robots.

Example 20. The method of Example 17, further comprising receiving constraints data specifying one or more of: object constraints, including requirements pertaining to the physical process in relation to the object; and system constraints, including one or more of system capabilities and system limitations for one or more robots (e.g., in each set of robots) of the one or more sets of robots, wherein the one or more operation sequences are determined based on the constraints data, and wherein the operation schedule is generated based on the constraints data.

Example 21. The method of Example 17, wherein the determining the one or more operation sequences comprises by extracting, from the object data, operation data for a plurality of physical operations to be performed by one or more robots to accomplish the physical process, wherein the set of physical operations are selected from the plurality of physical operations.

Example 22. The method of Example 17, further comprising receiving operation data for a plurality of physical operations to be performed by the one or more sets of robots to accomplish the physical process, wherein the set of physical operations are selected from the plurality of physical operations.

Example 23. The method of Example 22, further comprising associating each of the one or more points of the object with one or more physical operations of the set of physical operations based on the object data and the operation data.

Example 24. The method of Example 17, wherein the object data indicates an arrangement or organization of constituent parts of the object.

Example 25. The method of Example 17, further comprising determining from the object data an arrangement (e.g., organization) of constituent parts of the object.

Example 26. A non-transitory computer readable medium having instructions that, when executed by one or more processors of a computing system, cause the computing system to: receive object data for an object that is a subject of a physical process to be accomplished, the object data specifying points of the object; determine one or more operation sequences each to accomplish a portion of the physical process, each operation sequence providing an ordering of a set of physical operations associated with the one or more points of the object; generate an operation schedule specifying timing of performance of each operation sequence of the one or more operation sequences and a set of one or more sets of robots to perform each operation sequence; generate physical process data comprising the operation schedule and the one or more operation sequences; and communicate the physical process data to the one or more sets of robots to perform the one or more operation sequences according to the operation schedule.

Example 27. A system to accomplish one or more physical processes, the system comprising: one or more sets of robots, each robot to perform one or more physical operations; a computing device in communication with each of the one or more sets of robots, the computing device comprising: a communication interface; and one or more processors to: receive object data for a plurality of distinct objects (e.g., the plurality including multiple object types) and each a subject of a physical process, the object data specifying points of the object; determine a plurality of operation sequences each to accomplish a portion of at least one of the plurality of physical processes, each operation sequence of the plurality of operation sequences providing an ordering of a set of physical operations that are associated with the one or more points of an object (of the plurality of objects) and that are to be performed by a set of robots of the one or more sets of robots; generate an operation schedule specifying timing of performance of each operation sequence of the one or more operation sequences and a set of robots of the one or more sets of robots to perform each operation sequence; generate physical process data comprising the operation schedule and the one or more operation sequences; and communicate the physical process data, via the communication interface, to the one more sets of robots to perform the one or more operation sequences according to the operation schedule.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus.

Embodiments herein may include various engines, which may be embodied in machine-executable instructions to be executed by a general-purpose or special-purpose computer (or other electronic device). Alternatively, the engine functionality may be performed by hardware components that include specific logic for performing the function(s) of the engines, or by a combination of hardware, software, and/or firmware.

Principles of the present disclosure may be reflected in a computer program product on a tangible computer-readable storage medium having stored instructions thereon that may be used to program a computer (or other electronic device) to perform processes described herein. Any suitable computer-readable storage medium may be utilized, including magnetic storage devices (hard disks, floppy disks, and the like), optical storage devices (CD-ROMs, DVDs, Blu-Ray discs, and the like), flash memory, and/or other types of medium/machine readable medium suitable for storing electronic instructions. These instructions may be loaded onto a general purpose computer, special purpose computer, or other programmable data processing apparatus to produce a machine, such that the instructions that execute on the computer or other programmable data processing apparatus create means for implementing the functions specified. These instructions may also be stored in a computer-readable memory that can direct a computer or other programmable data processing apparatus to function in a particular manner, such that the instructions stored in the computer-readable memory produce an article of manufacture including instruction means which implement the function specified. The instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, JavaScript, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and MacOS. Alternatively, it is expected that future embodiments will be adapted to execute on other future operating systems.

It will be obvious to those having skill in the art that many changes may be made to the details of the above-described embodiments without departing from the underlying principles of the invention. The scope of the present invention should, therefore, be determined only by the following claims.

The invention claimed is:

1. A system comprising:

one or more robot stations, each robot station comprising one or more robots to perform one or more physical operations;

a controller computing device in communication with each of the one or more robot stations to:

receive object data for an object that is a subject of a physical process to be accomplished;

determine one or more operation sequences each to accomplish a portion of the physical process, each operation sequence of the one or more operation sequences providing an ordering of a set of physical operations that are to be performed by a robot station of the one or more robot stations;

generate an operation schedule specifying timing of performance of each operation sequence of the one or more operation sequences; and communicate the operation schedule and the one or more operation sequences, via a communication interface, to the one or more robot stations to perform the one or more operation sequences according to the operation schedule.

2. The system of claim 1, wherein the controller computing device is further to receive system data specifying system capabilities for each robot in each station of the one or more robot stations.

3. The system of claim 1, wherein the controller computing device is further to receive object constraints, including requirements pertaining to the physical process in relation to the object, wherein the controller computing device is to determine the one or more operation sequences based on the object constraints, and wherein the controller computing device is to generate the operation schedule based on the object constraints.

4. The system of claim 1, wherein the controller computing device is to determine the one or more operation sequences by determining, based on the object data, a plurality of physical operations to be performed by one or more robots to accomplish the physical process, wherein the set of physical operations for which an ordering is provided by an operation sequence are from the plurality of physical operations.

5. The system of claim 1, wherein the controller computing device is further to receive operation data for a plurality of physical operations to be performed by a robot station of the one or more robot stations to accomplish the physical process, wherein the set of physical operations for which an ordering is provided by an operation sequence are from the plurality of physical operations.

6. The system of claim 5, wherein the object data specifies one or more points of the object, and wherein the controller computing device is to further to associate each of the one or more points of the object with one or more physical operations of the set of physical operations based on the object data and the operation data.

7. The system of claim 1, wherein the controller computing device is further to receive:

system constraints, including one or more of system capabilities and system limitations for one or more of the one or more robots, wherein the controller computing device is to determine the one or more operation sequences based on the system constraints, and wherein the controller computing device is to generate the operation schedule based on the system constraints.

8. The system of claim 1, wherein the object data indicates an organization of constituent parts of the object.

9. The system of claim 1, wherein the physical process is one of:

assembling the object that is the subject of the physical process;

disassembling the object that is the subject of the physical process;

inspecting the object that is the subject of the physical process;

moving the object that is the subject of the physical process;

integrating constituent parts of the object that is the subject of the physical process; and applying another element to the object.

10. The system of claim 1, wherein the object data comprises constituent part data and interconnection data to indicate one or more interconnections between two or more constituent parts.

11. The system of claim 1, wherein one or more of the one or more physical operations is a sub-physical process comprising a plurality of physical operations.

12. The system of claim 1, wherein the timing of performance of a first of the one or more operation sequences is relative to a second of the one or more operation sequences.

13. A method of a computing system to coordinate robots to perform one or more physical operations, comprising:

receiving object data for an object that is a subject of a physical process to be accomplished;

determining one or more operation sequences each to accomplish a portion of the physical process, each operation sequence providing an ordering of a set of physical operations that are to be performed by a robot station of one or more robot stations, each of the one or more robot stations comprising one or more robots;

generating an operation schedule specifying timing of performance of each operation sequence of the one or more operation sequences and which robot station of the one or more robot stations to perform each operation sequence; and communicating the one or more operation sequences and the operation schedule to the one or more robot stations to perform the one or more operation sequences according to the operation schedule.

14. The method of claim 13, further comprising using the one or more robot stations to perform the one or more operation sequences according to the operation schedule.

15. The method of claim 13, further comprising obtaining system characteristics specifying system capabilities for the one or more robot stations.

16. The method of claim 13, further comprising:

receiving object constraints, including requirements pertaining to the physical process in relation to the object, wherein the one or more operation sequences are determined based on the object constraints, and wherein the operation schedule is generated based on the object constraints.

17. The method of claim 13, wherein determining the one or more operation sequences comprises by extracting, from the object data, operation data for a plurality of physical operations to be performed by one or more robots to accomplish the physical process, wherein the set of physical operations are selected from the plurality of physical operations.

18. The method of claim 13, further comprising receiving operation data for a plurality of physical operations to be performed by the one or more robot stations to accomplish the physical process, wherein the set of physical operations are selected from the plurality of physical operations.

19. The method of claim 18, further comprising wherein the object data specifies one or more points of the object and associating each of the one or more points of the object with one or more physical operations of the set of physical operations based on the object data and the operation data.

20. The method of claim 13, wherein the object data indicates an arrangement or organization of constituent parts of the object.

21. The method of claim 13, further comprising determining from the object data an arrangement of constituent parts of the object.

* * * * *